US012696843B2

(12) United States Patent
Prapas et al.

(10) Patent No.: US 12,696,843 B2
(45) Date of Patent: *Aug. 4, 2026

(54) SYSTEM AND METHOD FOR AQUATIC PLANT HARVESTING

(71) Applicant: 42FARMS, LLC, Bolinas, CA (US)

(72) Inventors: Jason Prapas, Petaluma, CA (US); Valerie Peng, Petaluma, CA (US)

(73) Assignee: 42FARMS, LLC, Bolinas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/082,051

(22) Filed: Mar. 17, 2025

(65) Prior Publication Data

US 2025/0212729 A1 Jul. 3, 2025

Related U.S. Application Data

(60) Continuation of application No. 17/578,972, filed on Jan. 19, 2022, now Pat. No. 12,274,204, which is a division of application No. 17/110,244, filed on Dec. 2, 2020, now Pat. No. 11,266,068.

(60) Provisional application No. 63/008,501, filed on Apr. 10, 2020, provisional application No. 63/007,832, filed on Apr. 9, 2020, provisional application No. 62/942,691, filed on Dec. 2, 2019.

(51) Int. Cl.
*A01D 44/00* (2006.01)
*E04H 4/16* (2006.01)

(52) U.S. Cl.
CPC .......... *A01D 44/00* (2013.01); *E04H 4/1654* (2013.01)

(58) Field of Classification Search
CPC ...... A01D 44/00; E04H 4/1654; A01G 31/00; A01G 33/00
See application file for complete search history.

(56) References Cited

U.S. PATENT DOCUMENTS

| | | | |
|---|---|---|---|
| 1,571,395 A | 2/1926 | Clark | |
| 2,181,863 A | 12/1939 | Eddie | |
| 2,320,283 A | 5/1943 | Knowlton et al. | |
| 2,629,218 A | 2/1953 | Smith | |
| 2,907,162 A | 10/1959 | Issaiewitch | |
| 2,919,027 A | 12/1959 | Blumenfeld | |
| 2,975,791 A | 3/1961 | Pansini | |
| 3,238,549 A | 3/1966 | Burlin et al. | |
| 3,254,355 A | 6/1966 | Shaw et al. | |
| 3,546,858 A | 12/1970 | Chaplin | |
| 3,862,537 A | 1/1975 | Chaplin | |
| 3,878,669 A | 4/1975 | Chaplin | |

(Continued)

FOREIGN PATENT DOCUMENTS

| | | |
|---|---|---|
| CN | 109336248 A | 2/2019 |
| WO | WO2010123943 A1 | 10/2010 |
| WO | WO2019171380 A1 | 9/2019 |

*Primary Examiner* — Huan Le

(74) *Attorney, Agent, or Firm* — Dianne E. Reed; VLP Law Group LLP

(57) ABSTRACT

A system for aquatic plant processing includes a harvester, which includes a nozzle assembly and optionally a pump assembly; and a transport subsystem. Additionally or alternatively, the system can include and/or interface with any or all of: a conduit, a collection assembly, a control subsystem, a sensor subsystem, a pond, and/or any other suitable components. A method for harvesting includes operating the harvesting system in a set of one or more operation modes.

20 Claims, 26 Drawing Sheets

(56) References Cited

U.S. PATENT DOCUMENTS

| 3,969,249 | A | 7/1976 | Dodd |
| 4,222,217 | A | 9/1980 | Brown |
| 5,235,797 | A | 8/1993 | Sygen et al. |
| 5,438,794 | A | 8/1995 | Wi |
| 5,490,920 | A | 2/1996 | Fruchtbaum et al. |
| 5,585,626 | A | 12/1996 | Beck et al. |
| 6,398,878 | B1 | 6/2002 | Henkin et al. |
| 6,910,319 | B2 | 6/2005 | Castleberry |
| 7,000,372 | B2 | 2/2006 | Kretsch |
| 7,465,392 | B1 | 12/2008 | Wang |
| 7,921,595 | B1 | 4/2011 | Monson et al. |
| 8,479,481 | B2 | 7/2013 | O'Toole et al. |
| 9,200,427 | B2 | 12/2015 | Phillips |
| 9,894,856 | B2 | 2/2018 | Javan et al. |
| 10,278,375 | B2 | 5/2019 | Saue |
| 10,602,663 | B2 | 3/2020 | Szabo |
| 10,851,511 | B2 | 12/2020 | Shurtleff |
| 10,925,212 | B2 | 2/2021 | Lapidot |
| 11,266,068 | B2 * | 3/2022 | Prapas .................. A01D 44/00 |
| 12,274,204 | B2 * | 4/2025 | Prapas ................. E04H 4/1654 |
| 2006/0150601 | A1 | 7/2006 | Britton |
| 2013/0095544 | A1 | 4/2013 | Berlowitz et al. |
| 2013/0309014 | A1 | 11/2013 | Biley et al. |
| 2014/0231326 | A1 | 8/2014 | Biley et al. |
| 2014/0353221 | A1 | 12/2014 | Biley et al. |
| 2017/0268192 | A1 | 9/2017 | Biley et al. |
| 2019/0274247 | A1 | 9/2019 | Lapidot et al. |
| 2020/0267900 | A1 | 8/2020 | Van Ert |
| 2020/0333782 | A1 | 10/2020 | Kent et al. |
| 2021/0161071 | A1 | 6/2021 | Prapas et al. |
| 2021/0260775 | A1 | 8/2021 | Mizoguchi |
| 2022/0132738 | A1 | 5/2022 | Prapas et al. |

* cited by examiner

200

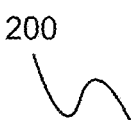

Operating a plant harvesting system in a set of operation modes

Harvesting operation mode

Adjusting a nozzle to a harvesting height or range of harvesting heights

↓

Moving a first axis rail to a first position (e.g., a particular row) along a length of the harvesting region

↓

Moving the nozzle along the first axis rail to enable the nozzle to traverse the width

↓

Collecting material via the pump assembly

↓

Transporting material to a collection system (e.g., via a gutter)

↓

Moving the nozzle to a second position and/or back to an initial position

↓

Repeating any or all of the above processes

| Off mode | Dredge operation mode |
|---|---|
| Media distribution mode | Cleaning mode |
| Collected plant processing mode | Sampling mode |
| Contaminant removal mode | Spray cooling mode |

FIGURE 2

X-axis rail

Nozzle

X-axis rail

Tank
(e.g., media distribution
and mixing)

Conduit
(e.g., gutter)

Strainer

Collection
assembly

Collection
assembly

Nozzle

Transport
subsystem

Conduit
(e.g., gutter)

Transport
subsystem

Pond

Nozzle

100

Multiple ponds

Mobile collection
assembly

100

Flotation device

Transport subsystem
(e.g., drivetrain, pulley system, etc.)

100

Nozzle assembly
(e.g., floating weir)

Collection assembly
(e.g., with strainer)

Media collection tank

Power source
(e.g., solar panel)

Inferior nozzle
region profiles
optional direction of nozzle travel
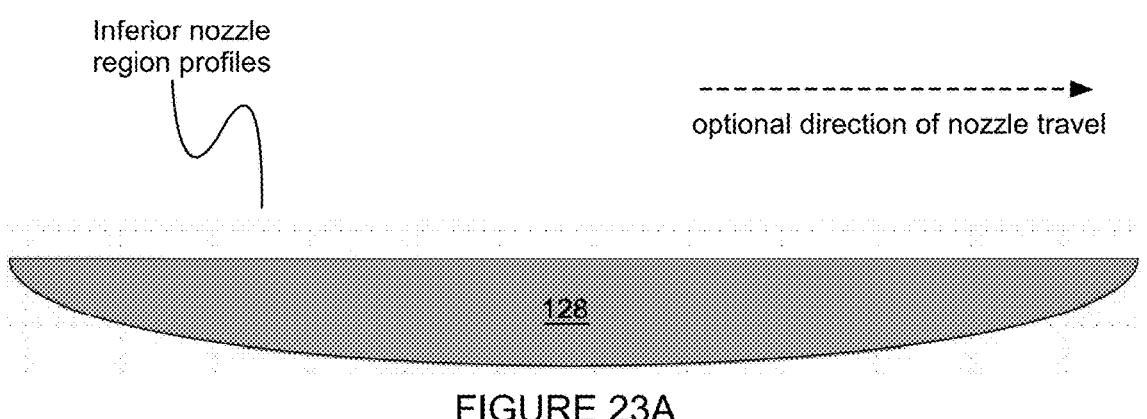
FIGURE 23A
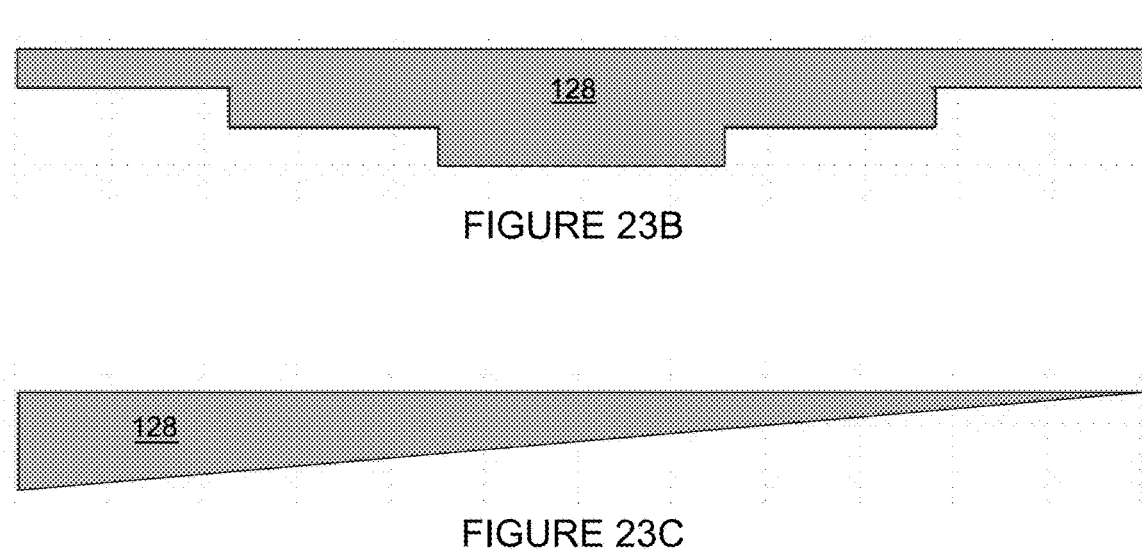
FIGURE 23B
FIGURE 23C
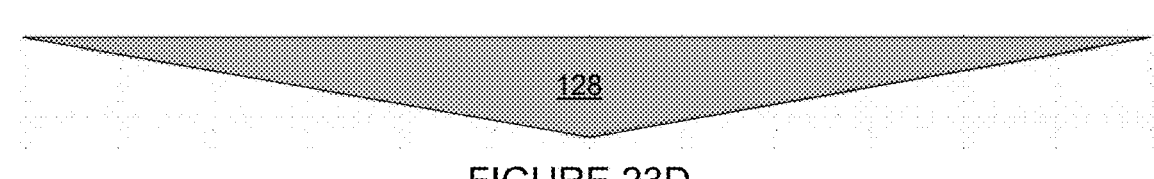
FIGURE 23D

SYSTEM AND METHOD FOR AQUATIC PLANT HARVESTING

CROSS-REFERENCE TO RELATED APPLICATIONS

This application is a continuation of U.S. application Ser. No. 17/578,972, filed 19 Jan. 2022, which is a divisional of U.S. application Ser. No. 17/110,244, filed 2 Dec. 2020, which claims the benefit of U.S. Provisional Application No. 62/942,691, filed 2 Dec. 2019, U.S. Provisional Application No. 63/007,832, filed 9 Apr. 2020, and U.S. Provisional Application No. 63/008,501, filed 10 Apr. 2020, each of which is incorporated in its entirety by this reference.

TECHNICAL FIELD

This invention relates generally to the agriculture field, and more specifically to a new and useful system and method for aquatic plant harvesting in the agriculture field.

BACKGROUND

Many types of aquatic plants are highly nutrient-dense, and therefore can be very valuable for use in different applications, such as providing a protein-rich food source for animals (e.g., livestock) and/or humans. Growing, harvesting, and properly maintaining aquatic plants is often very challenging, however. Many aquatic plants, for instance, are sensitive to their environment and therefore require a highly controlled growing environment. Further, the nature of their aquatic growing environment makes it difficult to remove and harvest the plants, as aquatic environments are conventionally less accessible, more subject to variation, and often more sensitive than land-based growing environments. The cultivation of aquatic plants is thus underserved by conventional agricultural technologies and as such, requires highly manual processes which are costly and suboptimal.

The inventors have discovered a new and useful system and method for the harvesting of aquatic plants.

BRIEF DESCRIPTION OF THE FIGURES

FIG. 2 is a schematic of a method for aquatic plant harvesting.

FIGS. 23A-23D depict schematic variations of nozzle profiles.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
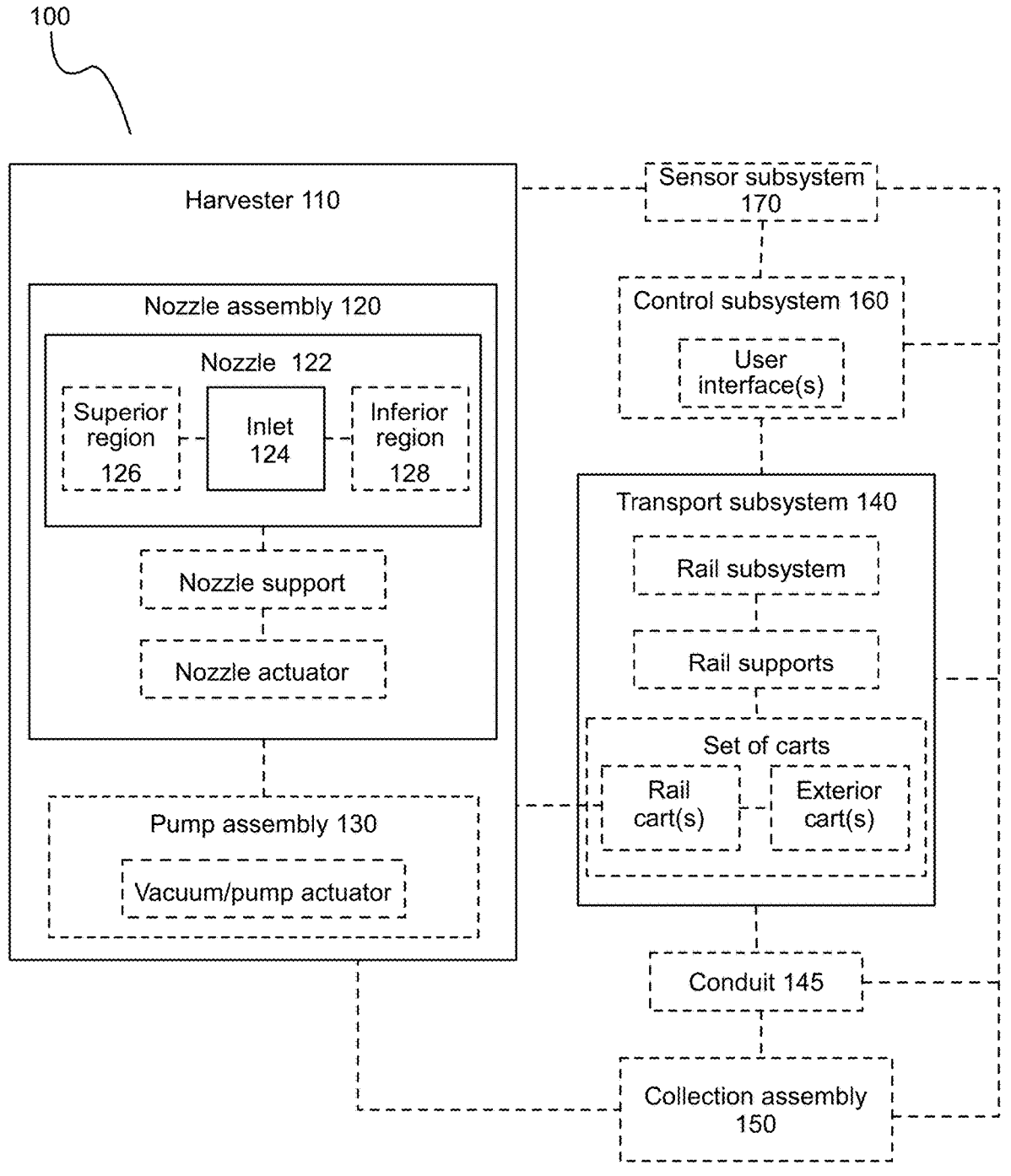
FIG. 1 is a schematic of a system for aquatic plant harvesting.

As shown in FIG. 1, a system 100 for aquatic plant harvesting includes a harvester 110, which includes a nozzle assembly 120 and optionally a pump assembly 130; and a transport subsystem 140. Additionally or alternatively, the system 100 can include and/or interface with any or all of: a conduit 145, a collection assembly 150, a control subsystem 160, a sensor subsystem 170, a pond, and/or any other suitable components.

The system 100 can be performed in accordance with any or all of the method 200. Additionally or alternatively, the system 100 can be implemented with any other suitable method(s).

As shown in FIG. 2, a method 200 for harvesting includes operating the harvesting system 100 in a set of one or more operation modes, wherein the set of operation modes includes at least a harvesting operation mode. Additionally or alternatively, the method 200 can be performed in accordance with any other suitable modes and/or to perform any other suitable processes.

The method 200 is preferably performed with a system 100 as described above, but can additionally or alternatively be performed with any other suitable system.

2. Benefits

The system and method for harvesting can confer several benefits over current systems and methods.

In a first set of variations, the system and/or method confers the benefit of efficiently and automatically harvesting plants (e.g., aquatic plants), which can be used in a variety of applications. In specific examples, the system and method are used to produce agricultural products, such as, but not limited to, any or all of: animal feed, biofertilizer, and/or protein for human consumption.

In a second set of variations, additional or alternative to those described above, the system and/or method confers the benefit of maintaining an optimal density of plants in the growing environment, such that high-output harvests can be easily, automatically, and frequently produced. In a first set of specific examples, a density of aquatic plants (e.g., as viewed as a surface coverage of a pond containing floating aquatic plants) is maintained within a set of density thresholds (e.g., above a minimum threshold immediately following a harvest, below a maximum threshold prior to a harvest and/or in-between harvests, etc.) such that an optimal growing environment is maintained and a harvest can be performed with a predetermined frequency (e.g., every 2 days, every day, depending on the plant's growth cycle, etc.). In a second set of specific examples, additional or alternative to the first, the system and method enable particular regions within a pond to be individually/independently harvested and/or otherwise processed (e.g., distribution of media), such that the pond is optimally maintained.

In a third set of variations, additional or alternative to those described above, the system and/or method confers the benefit of optimizing the collection of plants, which can include, for instance any or all of: maximizing the volume of plants collected; enabling the collection of whole, intact plants during harvesting; optimizing a fraction and/or density of plants collected in the nozzle versus those left behind; optimizing a way in which the collected plants are separated from the remaining plants (e.g., minimizing damage to the remaining plants); enabling optimal flow properties of the pond liquid (e.g., minimizing turbulence, creating a directionality of water flow to cause the remaining plants to fill in newly vacant areas created by the removed plants, etc.); enabling a nozzle to be adjusted to (e.g., continuously adjusted to) an optimal height relative to the pond surface; and/or enabling any other outcomes during harvesting and/or other operation modes. In specific examples, for instance, a nozzle assembly of a harvester is configured with a particular inlet dimension and optionally a superior and inferior portion (e.g., as described below) to minimize the occurrence of plant tearing during collection. In additional or alternative specific examples, the system optimizes (e.g., increases) a harvest efficiency (e.g., in kilograms [kg] of plant material removed per kilojoules [kJ] of energy consumed), which is partially determined by the plant:air:water ratio in the harvest stream, which can be dictated by any or all of: a nozzle geometry (e.g., frustoconical collection) and height, a z-height at which the nozzle is lowered into a body water, and/or any other features as described below.

In a fourth set of variations, additional or alternative to those described above, the system and/or method confers the benefit of producing aquatic plant product (e.g., crop products, high-nutrition crops, animal feed, etc.) with any or all of the following characteristics: affordable, organic, having a consistent nutrition profile, ultra high yield, novel, nutrient-dense, and requiring low resource use. In specific examples, any or all of these are enabled through any or all of: modular and scalable harvesting, automated and intelligent harvesting, and precisely-controlled growing and/or harvesting conditions (e.g., with a sensor subsystem in communication with the control subsystem).

In a fifth set of variations, additional or alternative to those described above, the system and/or method confers the benefit of enabling a modular and customizable harvesting architecture. In specific examples, the harvesting system can be built for and/or adapted to any or all of: man-made growing environments (e.g., ponds), naturally-occurring growing environments, multiple ponds (e.g., wherein the system can move among and between them), and/or any other growing environments.

Additionally or alternatively, the system and method can confer any other benefit(s).

3. System 100

The system 100 includes a harvester 110, which includes a nozzle assembly 120; a pump assembly 130; and a transport subsystem 140. Additionally or alternatively, the system 100 can include and/or interface with any or all of: one or more conduits 145, a collection assembly 150, a control subsystem 160, a sensor subsystem 170, processing equipment for the collected material(s) (e.g., sorting equipment, drying equipment, grinding equipment, etc.), a pond, and/or any other suitable components.

The system 100 preferably functions to harvest a region of plants in a semi-automated and/or fully automated fashion. The plants are preferably plants grown in an aquatic environment, equivalently referred to herein as aquatic plants, but can additionally or alternatively include non-aquatic plants, crops, and/or any other suitable materials. Additionally or alternatively, the system 100 can function to perform any or all of: producing and/or partially producing agricultural products (e.g., animal feed, livestock feed, etc.); otherwise processing the plant material to produce a plant product; collecting materials (e.g., media, water, debris, etc.) from a pond and/or other growing environment; separating materials (e.g., aquatic plants from water, debris from water, etc.); distributing media to the aquatic environment; preparing agricultural products (e.g., animal feed) from the plants; harvesting a target amount of aquatic plants in a planned harvest time and/or within any other objectives; traversing to access all points of the growth pond; conveying harvested plants to a storage tank; conveying harvested material with minimal damage to the harvested plants and minimum disturbance to the remaining growing plants; returning excess water from the harvest to the pond; performing one or more active pressing processes (e.g., washing, pressing, dewatering, drying, etc.); and/or performing any other suitable functions.

In preferred variations, the system 100 functions to interact with (e.g., harvest, combine-harvest, apply media distribution to, inoculate, process, etc.) aquatic plants from a pond in an automated fashion, wherein the automated interactions with the plants are preferably configured to optimize the interactions, such as based on sensor information associated with the growing environment of the plants and a control subsystem which operates based on this information. Additionally or alternatively, the system 100 can perform any other suitable functions.

The system 100 is preferably operated in accordance with a method 200 as described below, but can additionally or alternatively be configured for operation in other use cases and/or according to other methods.

3.1 System—Harvester 110

The system 100 includes a harvester 110, which is equivalently referred to herein as a combine, a combine-harvester and/or a multi-tool, wherein the harvester functions to collect plants from a growing environment (e.g., an aquatic growing environment) of the plants. Additionally or alternatively, the harvester can function to perform any or all of the functions and/or processes of a combine/combine-harvester (e.g., reaping, threshing, stacking, winnowing, hauling, etc.), perform maintenance of the growing environment media (e.g., media distribution, media removal, mixing, etc.), perform plant transportation, and/or can perform any other suitable functions.

Figure 19:
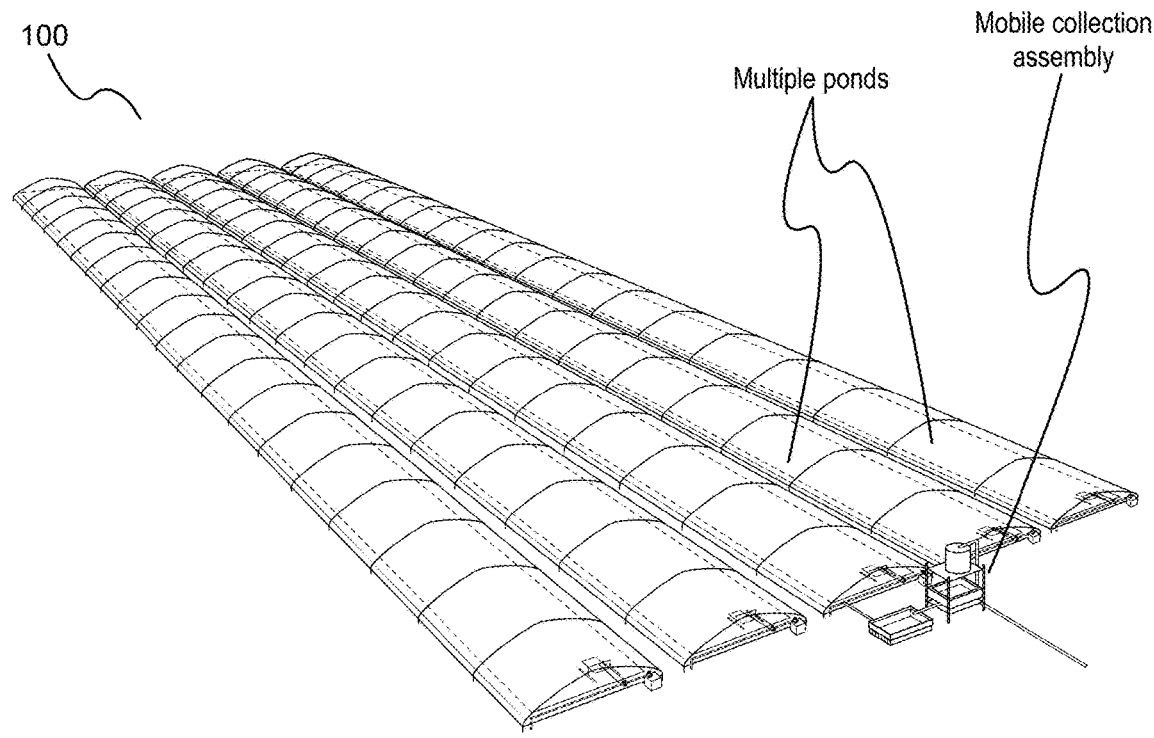
FIG. 19 depicts a variation of a system which interfaces with multiple ponds.

The growing environment preferably includes one or more ponds (e.g., man-made ponds, natural ponds, indoor ponds, outdoor ponds, etc.), wherein a pond refers to any body of water and/or aquatic growing environment, but can additionally or alternatively include any other suitable growing environments (e.g., non-aquatic environments, soil, etc.). In some variations, the system 100 is configured to interface with multiple growing environments, such as multiple ponds (e.g., as shown in FIG. 19), wherein the system 100 can move between and among each of the growing environments.

The plants collected by the system 100 preferably include aquatic plants, further preferably floating aquatic plants (e.g., flowering aquatic plants), such as those that float at or near the water's surface. In some variations, the floating aquatic plants are from the Lemnoideae and/or Lemnoceae families, such as any or all of: duckweeds (e.g., common duckweed, Spirodela polyrhiza, Wolffia, etc.) water lentils, and water lenses. Additionally or alternatively, the floating aquatic plants can include non-floating and/or rooted aquatic plants, aquatic ferns (e.g., Azolla plants, water ferns, water clovers, Salvinia, mosquito ferns, etc.), and/or any other suitable aquatic plants.

Further additionally or alternatively, the plants can include non-aquatic plants and/or any other suitable plants and/or crops.

Various plant parameters are preferably monitored, controlled, and/or maintained by the system (e.g., and throughout any or all of the method 200), which functions to create and maintain an optimal growing environment for the plants. This can additionally function, for instance, to promote and/or enable harvesting goals of the method, such as any or all of a harvesting frequency (e.g., every other day, once per day, etc.), a harvest amount (e.g., volume, mass, etc.), a harvesting ratio of the materials being collected at a nozzle (e.g., plant:water ratio, plant:air:water ratio, etc.), and/or any other suitable goals/parameters. In some variations, this can include any or all of: maintaining a density or range of densities of plants in a pond (e.g., grams per meters-squared, area of floating aquatic plants on a pond surface, volume of aquatic plants relative to a pond volume, etc.) which can impact, for instance, an amount of light let into a pond (e.g., which can affect the growth of other organisms). In additional or alternative variations, this include any or all of: maintaining a level of debris (e.g., accumulated biomass) below a predetermined threshold (and/or within a threshold range and/or above a predetermined threshold); harvesting within the optimal regions within a pond (e.g., to prevent overharvesting a particular region and leaving no aquatic plants behind, to account for spreading of the remaining plant material after harvesting, to maintain a uniform spread of plant material left behind after harvesting, etc.); harvesting the plants from an optimal height relative to a pond surface (e.g., consistent height relative to the pond surface, variable height optimal for the plant, etc.); and/or can enable any other optimal conditions associated with the plants.

In preferred variations, for instance, the harvester operates to maintain an optimal composition (e.g., density, volume, etc.) of aquatic plants within a pond, which can involve maintenance of any or all of: a plant surface density relative to the surface and/or volume of the pond; a debris volume and/or density relative to the surface and/or volume of the pond; a frequency of fresh media additions; and/or optimizing for any other suitable parameters (e.g., light, temperature, humidity, etc.).

In specific examples, aquatic plants are used which double their biomass every 1.5 to 3 days, wherein the density of these plants is maintained to be between 500 to 1200 grams per meters-squared ($g/m^2$) (e.g., 700-2000 $g/m^2$, 500-1200 $g/m^2$, 700-100 $g/m^2$, 500 $g/m^2$, 600 $g/m^2$, 700 $g/m^2$, 800 $g/m^2$, 900 $g/m^2$, 1000 $g/m^2$, 1100 $g/m^2$, 1200 $g/m^2$, etc.) on a fresh weight basis.

Additionally or alternatively, any other aquatic plants and associated biomass doubling times (e.g., 1 day, less than 1 day, between 1 day and 2 days, 2 days, between 2 days and 3 days, 3 days, between 3 days and 5 days, 5 days, between 5 days and 10 days, greater than 10 days, etc.), wherein the density of the plants is maintained between any suitable densities (e.g., between 100 and 500 grams per meters-squared, less than 100 grams per meters-squared, between 500 and 1000 grams per meters-squared, between 1000 and 2000 grams per meters-squared, between 2000 and 3000 grams per meters-squared, greater than 3000 grams per meters-squared, etc.).

The density of these plants can additionally or alternatively include a surface density (e.g., wherein the volume density is calculated and/or estimated based on the surface density, wherein the surface density and volume density are both used, wherein the surface density is instead used, etc.) and/or any other suitable density and/or parameter(s).

For variations including aquatic plants, the harvester preferably collects the aquatic plants from a pond. The pond is preferably a man-made aquatic environment, but can additionally or alternatively include any naturally-occurring aquatic environments.

The pond can be any suitable shape, such as any or all of: rectangular (e.g., square, non-square, etc.), circular, ovate, ellipsoidal, and/or any other suitable regular and/or irregular shape (e.g., diamond, triangle, etc.). The pond depth (as measured in a Z-direction) can be determined based on any or all of: the aquatic plant type and its growing conditions (e.g., floating at the surface, columnar, on the pond floor, etc.), desired thermal properties for the plants (e.g., increased thermal buffering as depth increases), a desired uniformity in depth of the pond (e.g., to achieve a desired and/or optimal nutrient concentration as a function of pond water depth), and/or any other suitable parameters. In preferred variations, the pond depth is between 10 and 30 centimeters (e.g., a uniform or near-uniform depth between 10 and 30 centimeters, a varied depth between 10 and 30 centimeters, etc.). Additionally or alternatively, the pond depth can be less than 10 centimeters (e.g., throughout the pond, at certain regions of the pond, etc.), greater than 30 centimeters (e.g., between 30 and 100 centimeters, between 30 and 1000 centimeters, greater than 1000 centimeters, etc.), and/or can have any other suitable depths.

Figures 24A, 24B, 24C, 24D:
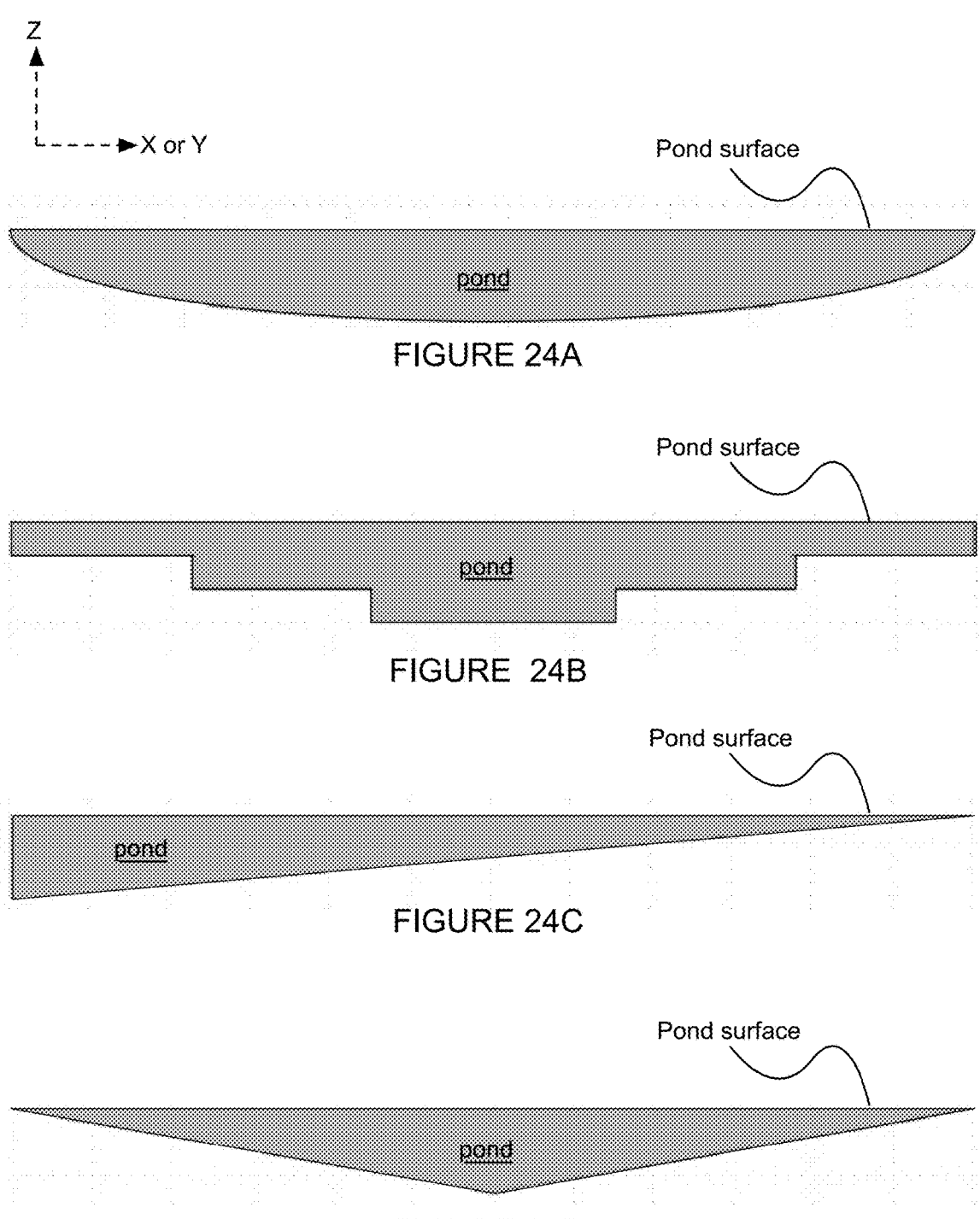
FIGS. 24A-24F depict schematic variations of pond cross section.
Figure 24E:
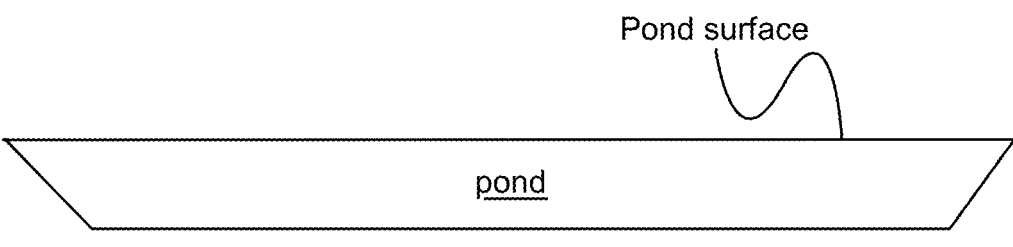
Figure 24F:
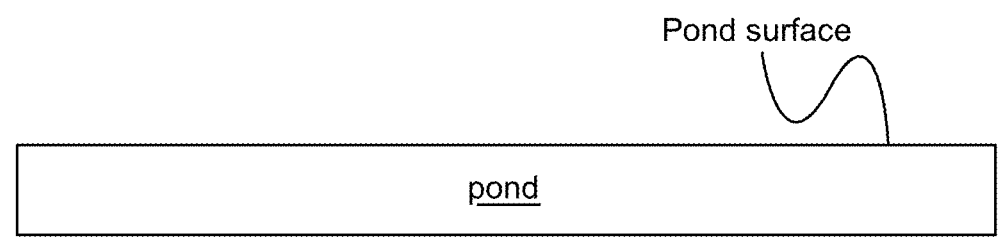

The pond can further have any suitable cross section geometry, such as rectangular (e.g., as shown in FIG. 24F), quadrilateral (e.g., with angled walls as shown in FIG. 24E), other polygonal shapes (e.g., as shown in FIGS. 24B-24D), curved (e.g., as shown in FIG. 24A), and/or have any other suitable cross-sectional shape. In some variations, for instance, rather than it being the same water height across the full width of the pond, the pond walls can define a gentle slope to a deepest point in the center (e.g., as shown in FIG. 24D, as shown in FIG. 24E, etc.). In additional or alternative variations (e.g., as shown in FIGS. 24A-24D), the pond cross section defines a shape which allows for multiple zones of different depths and/or defining one or more ledges, which could aid in inoculation and/or harvesting. In specific examples, having a V-shaped and/or terraced pond geometry can enable manipulation of where the plants are located simply by adding or removing water.

The pond can include any or all of: dirt (e.g., a leveled dirt patch on the bottom surface of the pond), liners, underlayment, coverings, walls, growth media and/or other nutrients, and/or any other suitable materials.

Additional or alternative to variations including aquatic plants, the plants can include non-aquatic plants. In such variations, additionally or alternatively to interfacing with a pond, the system 100 can interface with any or all of: indoor and/or outdoor planters or plots (e.g., in a greenhouse), agricultural land (e.g., farmland, cropland, etc.), and/or any other suitable plants in any suitable growing environment.

3.2 System—Nozzle Assembly 120

The harvester 110 includes a nozzle assembly 120, which functions to collect plants from their growing environment (e.g., pond) during harvesting. Additionally or alternatively, the nozzle assembly can function to collect any other materials associated with the growing environment (e.g., plant media, plant debris, water, biomass, etc.); collect materials in accordance with processes other than harvesting (e.g., media depositing and/or distribution, water removal, mixing of pond materials, debris removal, facilitation of plant spreading post-harvest, etc.); prevent and/or minimize collection of certain materials (e.g., minimize/prevent collection of materials inferior to the nozzle, minimize/prevent collection of biomass along a pond floor, etc.); maintain plant:water and/or a plant:air:water ratios; dispel materials into the growing environment (e.g., recycled materials such as water and/or media, new media, new water, etc.) and/or outside of the growing environment (e.g., to a collection chamber); and/or perform any other suitable functions.

The nozzle assembly 120 is preferably configured to collect plants in accordance with a value and/or range of values of plant to water ratios (e.g., by weight, by mass, by volume, etc.), wherein the water refers to the water solution in a pond (e.g., pure water, water mixed with media and/or debris, etc.). The plant to water ratio and/or range of plant to water ratios is preferably between 10% and 50% (e.g., 10%, between 10% and 20%, 20%, between 20% and 30%, 30%, between 30% and 40%, 40%, between 40% and 50%, 50%, etc.), but can additionally or alternatively be less than 10%, greater than 50% (e.g., 60%, between 60% and 70%, 70%, between 70% and 80%, 80%, between 80% and 90%, 90%, between 90% and 100%, 100%, etc.), and/or have any suitable value(s).

The nozzle assembly is further preferably configured to account for (e.g., be tolerant to, minimize, eliminate, etc.) differences in water height along the nozzle-water interface, which can be achieved through any or all of: an inlet size of the nozzle (e.g., sized larger to account for height differences), a shape and/or configuration of the nozzle. flow properties of the collected material (e.g., as enabled by one or more pump parameters and/or nozzle velocities), an ability to adjust a height of the nozzle (z-height) relative to the pond surface, and/or through any other components and/or component features. In preferred variations, the nozzle assembly is tolerant to differences up to 10 mm in water height across the surface of the pond, but can additionally or alternatively be tolerant to differences greater than 10 mm, less than 10 mm (e.g., for a highly level pond embodiment), and/or be otherwise suitably configured.

The nozzle assembly 120 includes a nozzle 122, which functions to collect plants through an inlet 124 and/or transport plants, such as during harvesting and/or any other operations. Additionally or alternatively, the inlet can function to collect other materials (e.g., pond water, pond debris, etc.), non-aquatic plants, and/or any other suitable materials. Further additionally or alternatively, the nozzle 122 can function to dispel one or more materials (e.g., media, nutrients, etc.) into the growing environment and/or perform any other suitable functions.

The nozzle 122 preferably collects materials (e.g., floating aquatic plants) from multiple directions through a set of one or more inlets 124. In preferred variations, the inlet(s) 124 are arranged circumferentially or nearly circumferentially (e.g., with separators in-between inlets), such that the nozzle can collect plants from 360 degrees or nearly 360 degrees (e.g., after taking into account supports and/or dividers between inlets). In additional or alternative variations, the nozzle can collect aquatic plants in a single direction and/or along a single axis (e.g., in the direction of nozzle movement), from a smaller range of directions (e.g., excluding collection through a trailing side of the inlet), along any number of multiple axes, omnidirectionally and/or nearly omnidirectionally (e.g., for a submerged nozzle), and/or from any other suitable directions.

The inlet can define any number of dimensions (e.g., critical dimensions, non-critical dimensions, etc.) such as a height of the inlet (e.g., dimension d2 in FIG. 5), a diameter of the inlet, a radius of the inlet, and/or any other suitable dimension(s). The inlet is preferably sized such that it is configured to optimally collect plants such as in any or all of the following ways: without blockage of the inlet and/or clogging, with minimal breakage of the plants, with an optimal ratio of plant biomass relative to air and/or water, with an optimal (e.g., maximum, consistent, etc.) flow velocity of plant biomass and/or other materials into the inlet, and/or any other the inlet can be otherwise suitably configured. The plants collected through the inlet are preferably aquatic plants which float near the surface of a pond, but can additionally or alternatively include non-floating aquatic plants, non-aquatic plants, and/or any other suitable plants. During use, the nozzle is further preferably placed relative to the plants to optimize collection of the plants (e.g., partially submerged to collect root first). Additionally or alternatively, the nozzle can be otherwise arranged.

In some variations, an inlet arranged circumferentially around a nozzle is configured with a height (e.g., d2 dimension) large enough to prevent blockage of the inlet while small enough to maximize a plant to water ratio being collected. For specific examples involving floating aquatic plants (e.g., duckweed, Azolla, etc.), the inlet height is preferably approximately or exactly 25 millimeters (mm). Additionally or alternatively, the inlet height can be any or all of: greater than 25 mm (e.g., between 25 and 50 mm, between 25 and 30 mm, 30 mm, between 30 and 35 mm, 35 mm, between 35 and 40 mm, 40 mm, between 40 and 45 mm, 45 mm, between 45 and 50 mm, 50 mm, greater than 50 mm, etc.), less than 25 mm (e.g., between 10 mm and 25 mm, between 10 and 15 mm, 15 mm, between 15 and 20 mm, 20 mm, between 20 and 25 mm, 25 mm, less than 10 mm, etc.), and/or can have any other suitable value(s).

The nozzle 122 includes and/or defines a structure configured to guide plants to the inlet of the nozzle. The structure of the nozzle can additionally or alternatively be configured to prevent and/or minimize the introduction of non-plant material to the inlet (e.g., biomass, pond material inferior to floating aquatic plants, etc.), redistribute the remaining plants during harvesting (e.g., does not require additional redistribution steps), and/or can be configured in any other suitable ways.

In some variations, for instance, the nozzle configuration optimizes the redistribution of plants after harvesting such that the density of the remaining crop after harvesting is uniform or substantially uniform (e.g., meeting a predetermined uniformity threshold, at least 50% uniform, at least 75% uniform, at least 80% uniform, at least 90% uniform, at least 95% uniform, etc.).

The nozzle preferably includes and/or defines a superior nozzle region 126 at least partially superior to the inlet(s) (e.g., a portion of the superior nozzle region is superior to the inlet, all of the superior nozzle region is superior to the inlet, etc.) and an inferior nozzle region 128 at least partially inferior to the inlet(s) (e.g., a portion of the inferior nozzle region is inferior to the inlet, all of the inferior nozzle region is inferior to the inlet, etc.). The superior nozzle region and the inferior nozzle region are preferably part of a single component (e.g., nozzle), but can additionally or alternatively separate components (e.g., separated by a gap, connected, etc.) and/or be otherwise arranged. In alternative variations, the nozzle is absent of the superior nozzle region, absent of the inferior nozzle region, and/or otherwise configured.

In preferred variations, the superior nozzle region 126 functions to guide (e.g., funnel) plants, such as floating aquatic plants, into the inlet. The superior nozzle region 126 is preferably non-vertical, such as sloped (e.g., as seen when viewing a profile of the superior nozzle region in an X-Z plane and/or an X-Y plane wherein the Z-axis is arranged vertically up and down in the direction of gravity) and/or curved (e.g., convex), such that aquatic plants are funneled by the superior nozzle region 126 into the inlet. The superior region preferably collects plant material from multiple directions (e.g., a 360-degree range, a 360-degree range minus a width of support materials arranged at the nozzle, between a 270-degree and 360-degree range, between a 300-degree and 360-degree range, a 180-degree range, etc.). Additionally or alternatively, the superior nozzle region 126 can collect plant material from a range associated with the nozzle's direction of travel (e.g., collect materials unidirectionally in the direction of travel) and/or from any other suitable directions and angle ranges.

Additionally or alternatively, the inferior nozzle region can function to guide plants into the inlet (e.g., collectively with the superior nozzle region, independently, etc.). In specific examples in which the nozzle assembly includes a floating weir, for instance, the inferior nozzle region functions to guide plants into the inlet.

In a first set of variations of the superior nozzle region 126 (e.g., as shown in FIGS. 5, 7-13), the superior nozzle region 126 defines a set of one or more slopes with respect to vertical as viewed from a profile of the superior nozzle region (e.g., in an X-Z plane, in a Y-Z plane, etc.). The set of one or more slopes preferably includes a first slope, wherein the first slope is further preferably a positive slope with respect to the Z-axis and/or an axis parallel with the Z-axis as viewed in a profile view of the superior nozzle region, but can additionally or alternatively include any other slopes defined in any suitable way to guide aquatic materials toward the inlet.

Figure 15A:
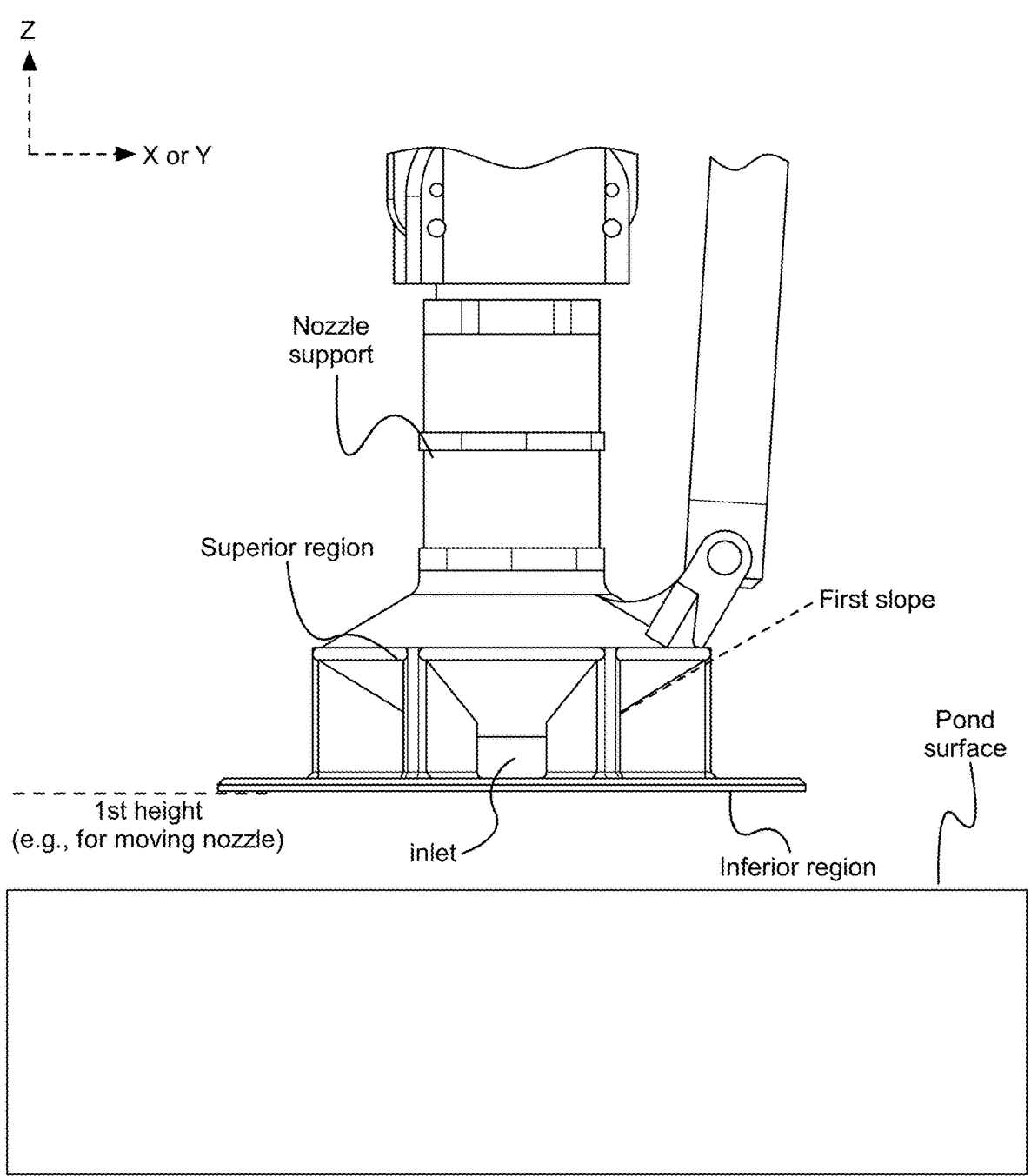
FIGS. 15A-15B depict an example of a nozzle and its optional arrangement relative to a pond surface.
Figure 15B:
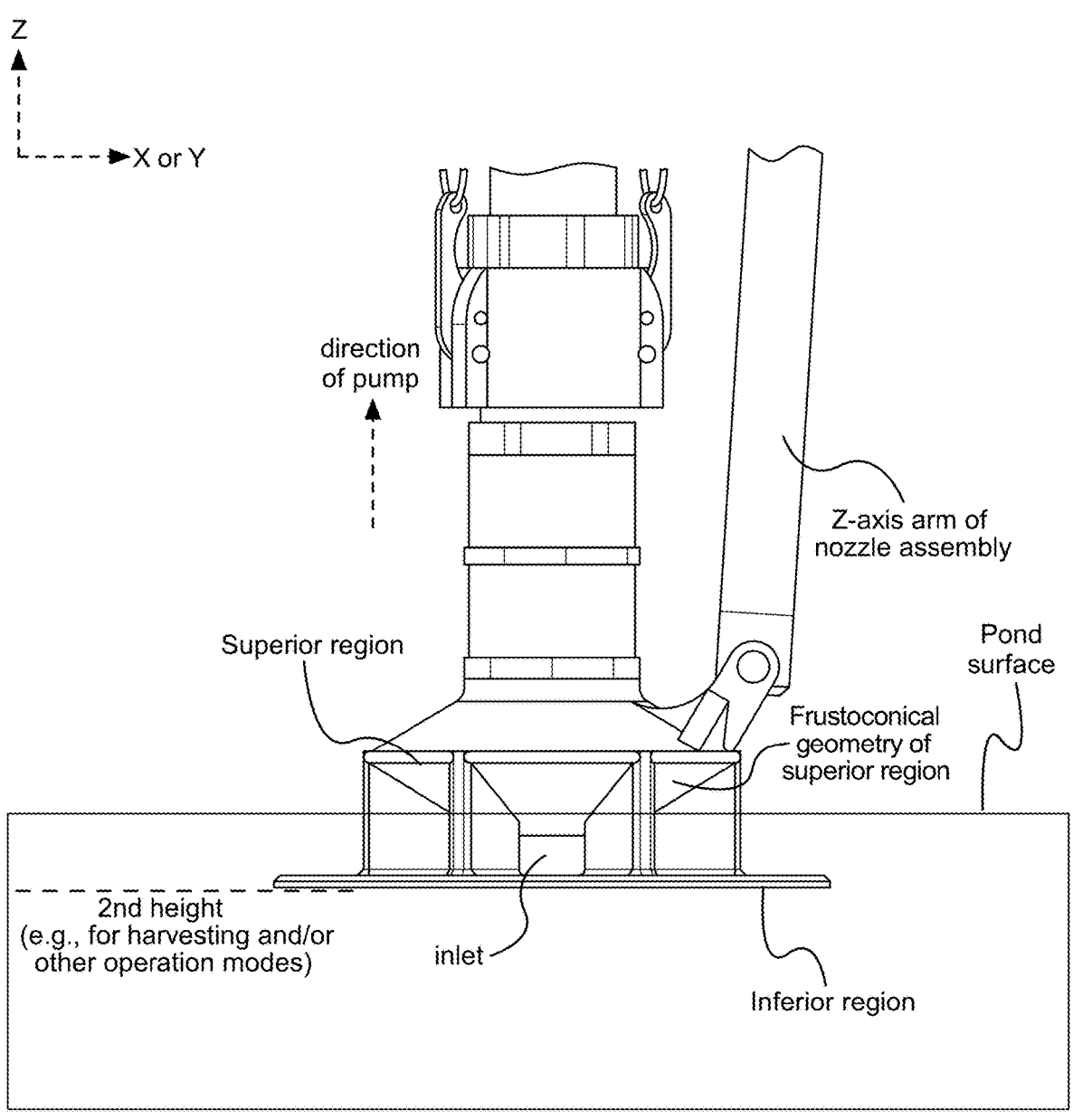

In a set of specific examples (e.g., as shown in FIGS. 15A-15B), the superior nozzle region 126 defines a conical and/or frustoconical region configured to funnel materials to the inlet.

In additional or alternative variations, one or both of the superior and inferior nozzle regions defines internal straight walls (e.g., 90-degree angle walls, substantially 90-degree angle walls) proximal to the inlet, which preferably still effectively function to bring aquatic plant material toward the inlet(s).

In some variation, the inferior region defines a curved and/or angled profile and/or cross section which can function to guide plants to the inlet, decrease drag while traversing through water, and/or can perform any other suitable function. Examples of profiles are shown in FIGS. 23A-23D.

Figure 16A:
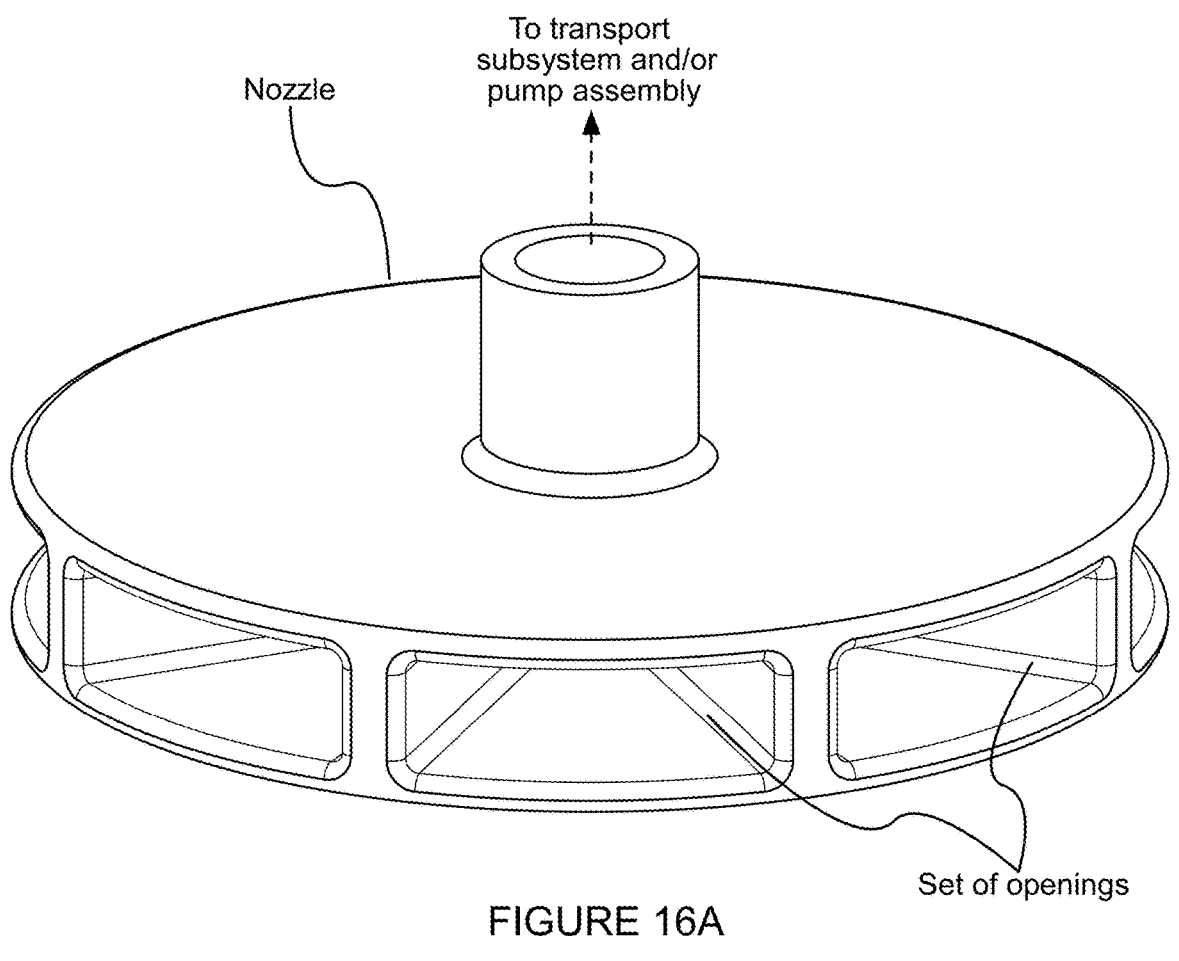
FIGS. 16A-16C depict an example of a nozzle.
Figure 16B:
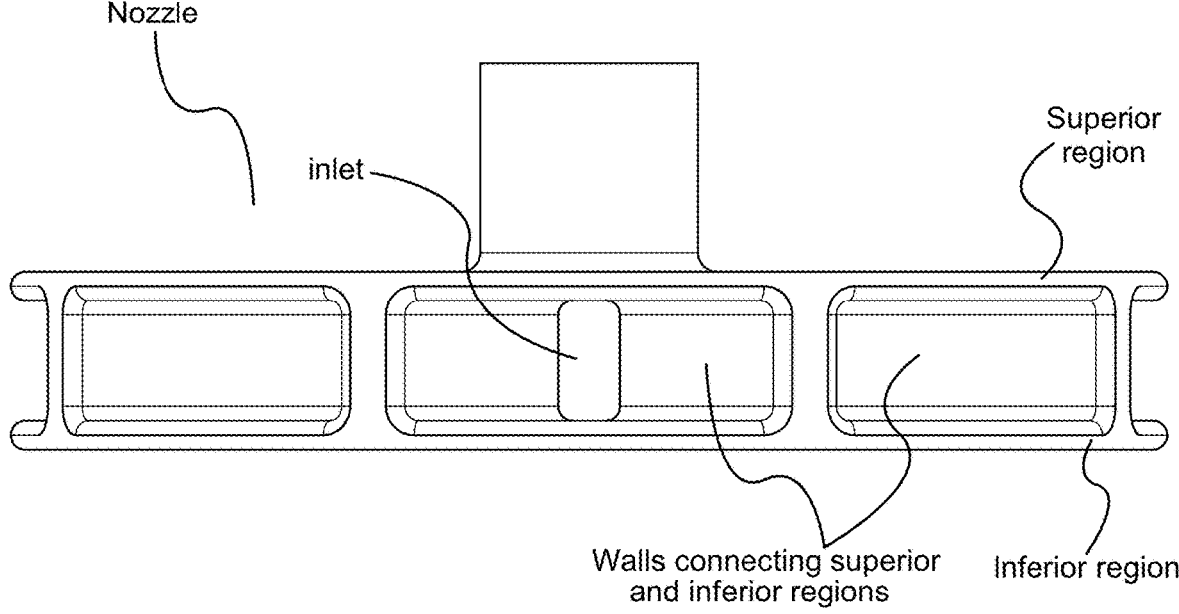
Figure 16C:
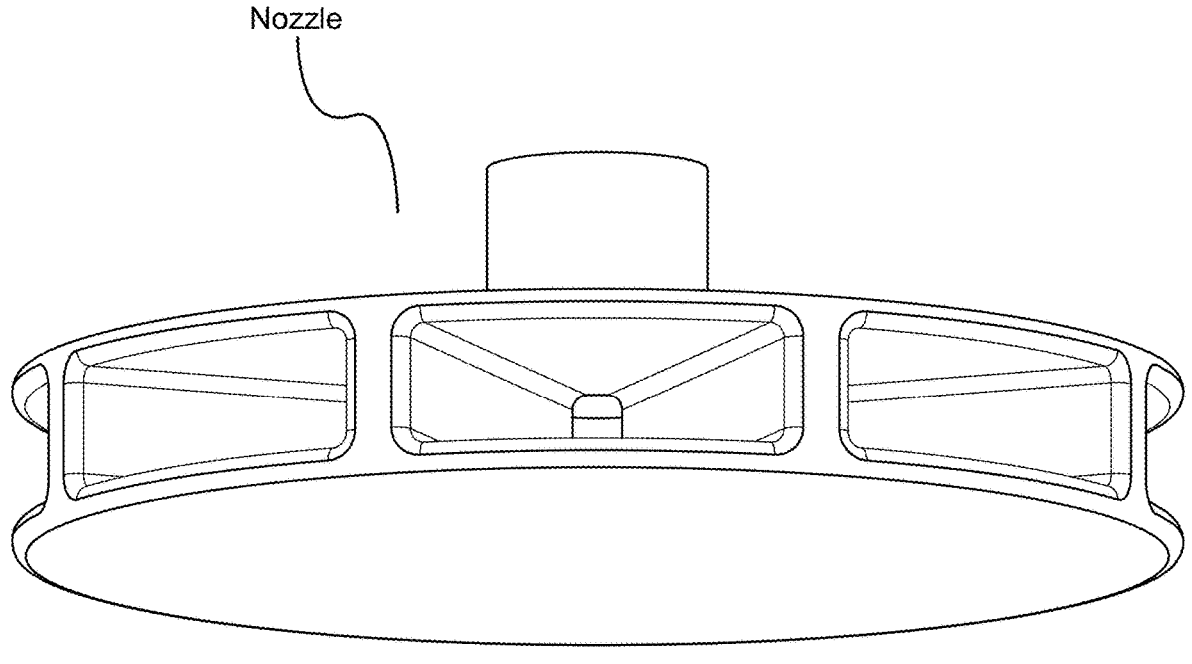

In a set of specific examples (e.g., as shown in FIGS. 16A-16C), the inlet is in fluid communication with a set of multiple openings (e.g., 8 openings, 7 openings, 6 openings, 4 openings, between 1 and 10 openings, greater than 10 openings, etc.), wherein the set of openings is defined by a set of walls, each wall defined by 90 degree angles and a consistent height.

Additionally or alternatively, the nozzle can be otherwise configured.

Figure 5:
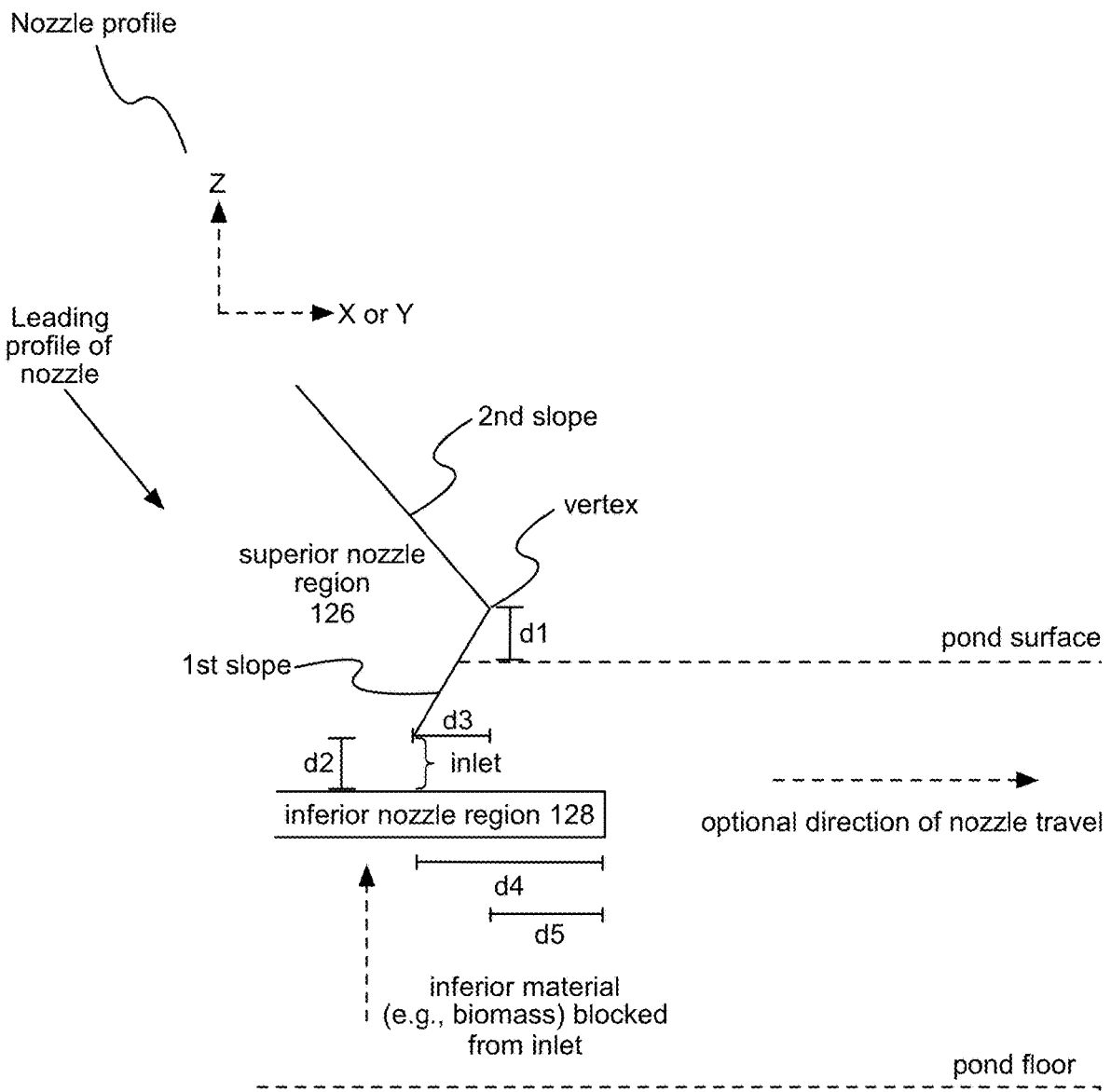
FIGS. 5-13 depict schematic variations of a nozzle profile.

The superior nozzle region can optionally define a second slope (e.g., as shown in FIG. 5) and/or any other number of slopes. The second slope is preferably defined by a region above (superior to) the first slope region and is preferably a negative slope, but can additionally or alternatively be positively sloped, arranged vertically, arranged horizontally, and/or be otherwise arranged. In variations including a first and second slope, the magnitude of the first slope is preferably greater than the magnitude of the second slope, but additionally or alternatively, the magnitude of the second slope can be greater than the magnitude of the first slope, the magnitudes can be equal, one or both of the first and second slopes can be replaced with a horizontally or vertically aligned section, and/or the superior nozzle region can be otherwise defined.

Figure 6:
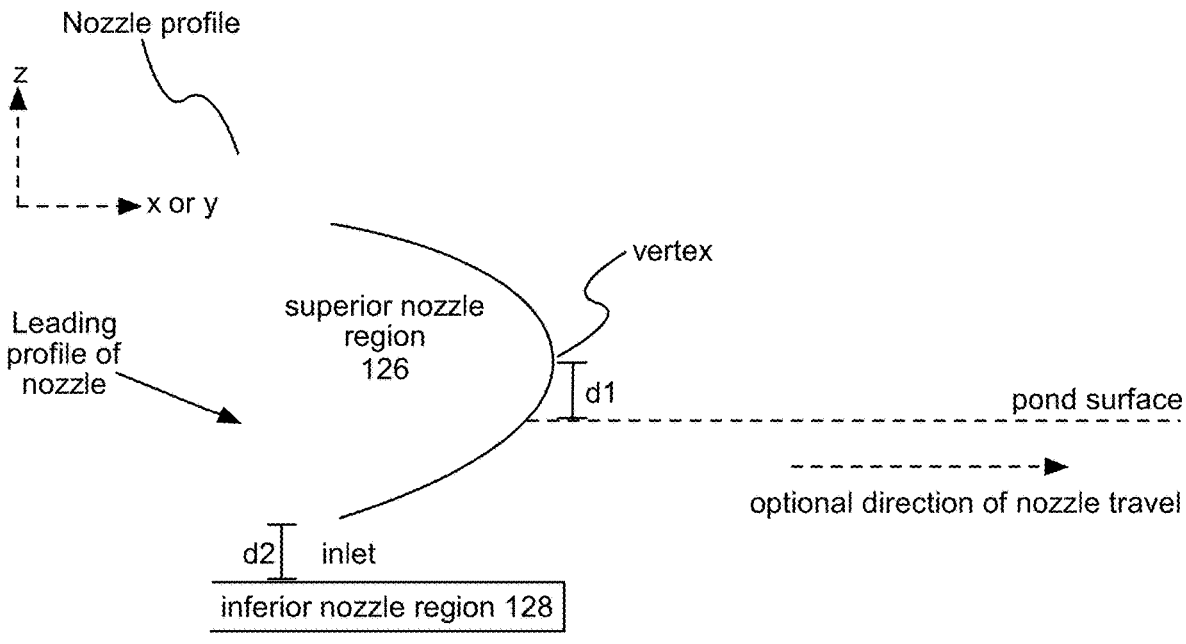
Figure 7:
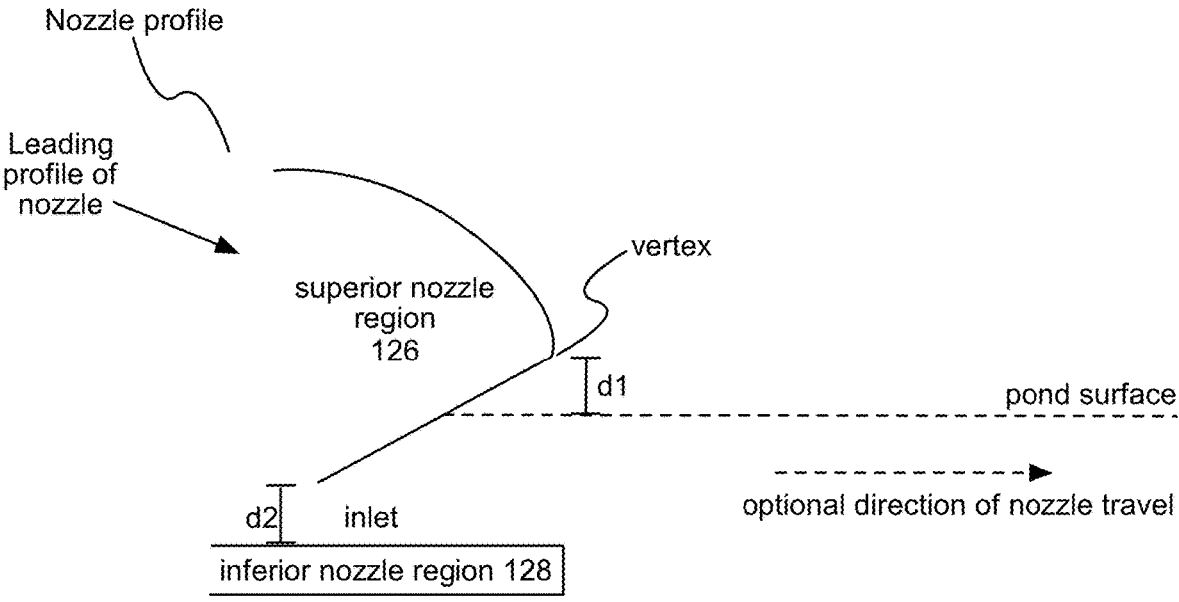
Figure 8:
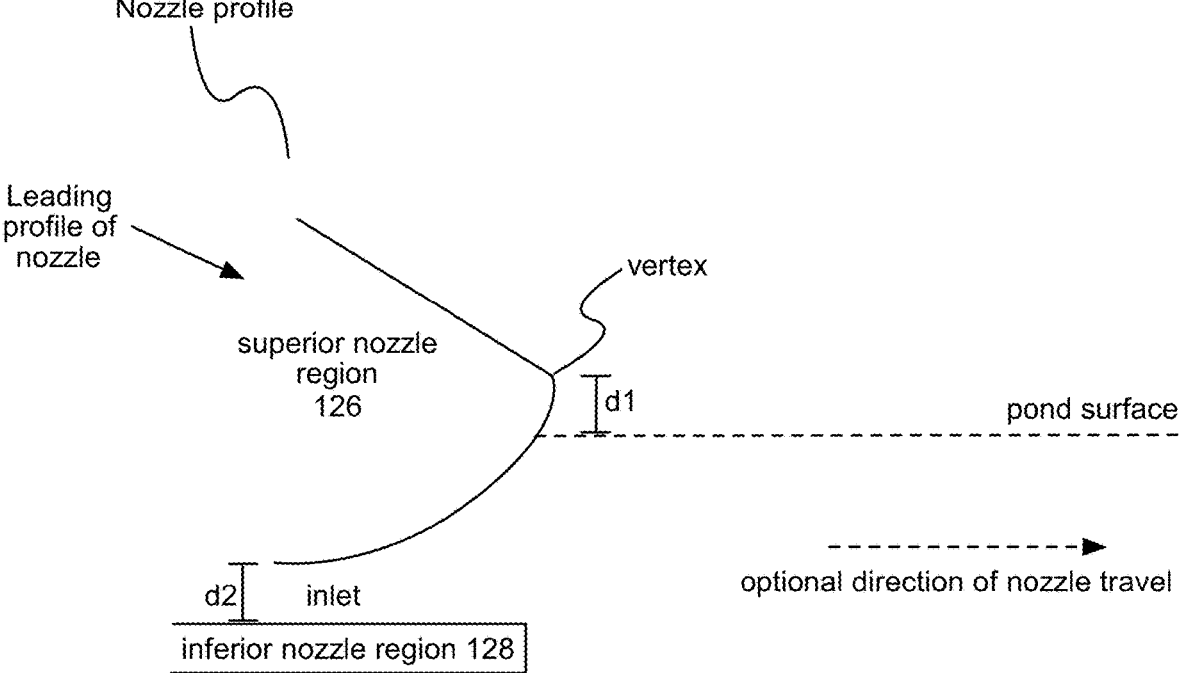
Figure 9:
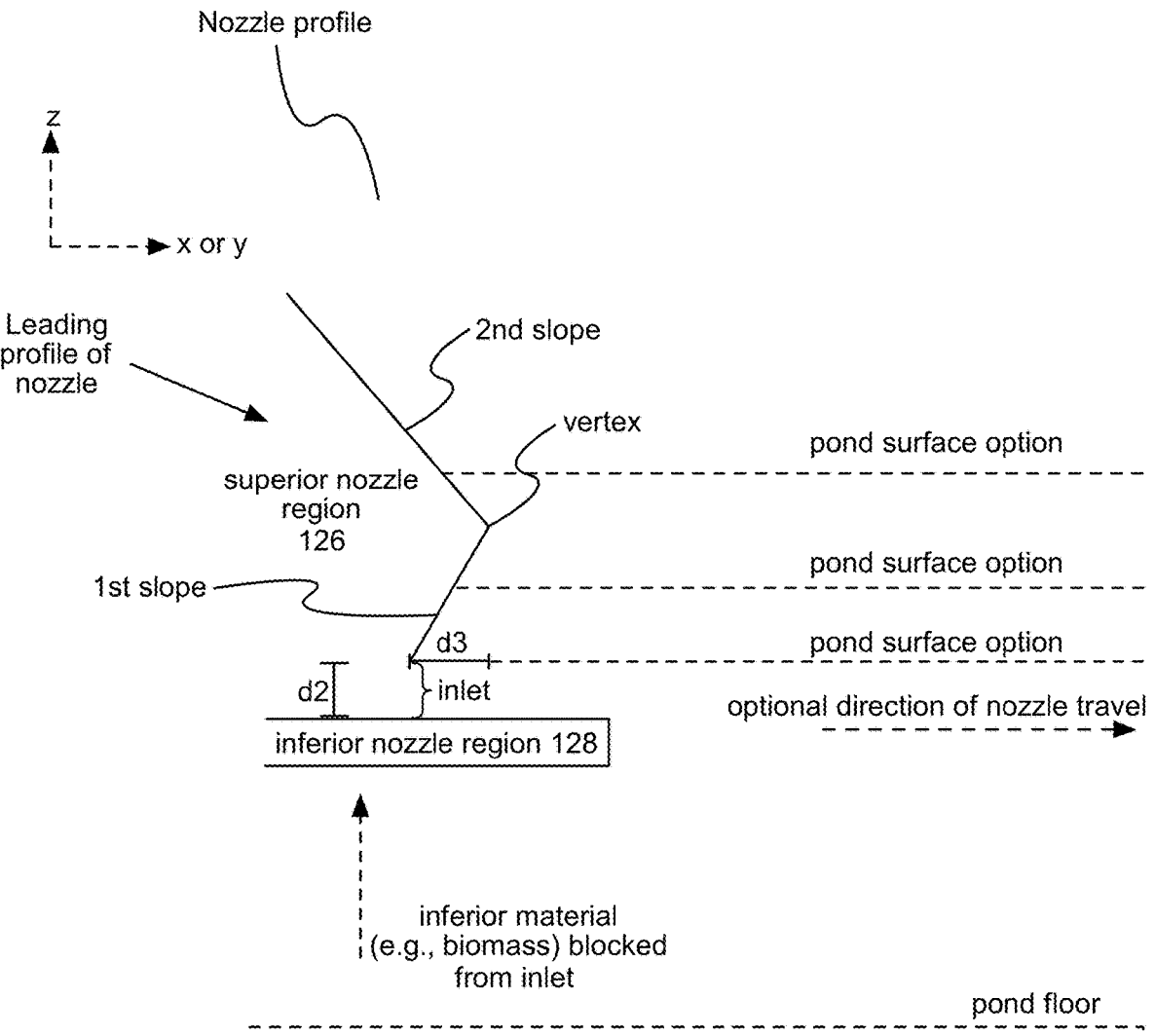

Additional or alternative to defining one or more sloped regions, the superior nozzle region and/or any other part of the nozzle can define one or more curved regions (e.g., as shown in FIGS. 6-8) or any combination of sloped and curved regions. In variations involving curved profiles, the curved regions preferably define slopes (e.g., average slopes) and/or approximate slopes which follow the same orientations and relations as described for the sloped regions above. Additionally or alternatively, the curved regions can be otherwise suitably defined.

The superior region can optionally define an inflection region such as a vertex (as viewed from a profile of superior nozzle region) or a vertex edge (as viewed in 3D, as viewed from a profile, etc.) defined by a curvature and/or a change in slope of the superior nozzle region. Additionally or alternatively, an inflection region can be defined by an inferior region (e.g., defined only by the inferior region, collectively defined by the superior and inferior regions, etc.), defined by and/or included with another component, and/or otherwise suitably defined.

The inflection region is preferably arranged above the pond surface during harvesting (e.g., when the nozzle is moving along the x and/or y axes, as shown in FIG. 5-8, etc.), but can additionally be otherwise arranged (e.g., below the pond surface, as shown in FIG. 8, at the pond surface, etc.). Additionally or alternatively, any or all of the superior region can be arranged above the pond surface during harvesting, any or all of the inferior region can be arranged above the pond surface during harvesting, all of the nozzle can be submerged, and/or the nozzle can be otherwise suitably arranged relative to the pond surface.

In variations defining a vertex/vertex edge (e.g., as shown in FIGS. 5-13), the vertex/vertex edge is preferably smoothed (e.g., filleted), which functions to prevent aquatic plants from getting stuck to (e.g., pierced by) the inflection region. The vertex/vertex edge preferably includes the farthest extending point(s) of the superior nozzle region, but can additionally include any other suitable regions.

The nozzle preferably defines an inferior nozzle region 128 inferior to the inlet, which functions to prevent materials inferior to the inferior component from being collected through the inlet. Additionally or alternatively, the inferior nozzle region can function to help direct aquatic plant material into the inlet (e.g., by providing an inferior barrier to plant travel as they are angled into the inlet by a superior region). The inferior nozzle region preferably extends past the inlet as indicated by the dimension "d4" (e.g., as shown in FIG. 5) and further preferably extends past an outermost point of the superior region (e.g., inflection region, vertex, etc.) as indicated by the dimension "d5." Additionally or alternatively, the inferior nozzle region can be otherwise arranged (e.g., defining a zero value for d4, defining a zero value for d5, defining a negative value for d4, defining a negative value for d5, etc.).

The inferior nozzle region preferably defines a thickness in the z-direction smaller than a thickness of the superior region, but can additionally or alternatively have the same thickness, a greater thickness, and/or any other suitable thickness.

Figures 10, 11:
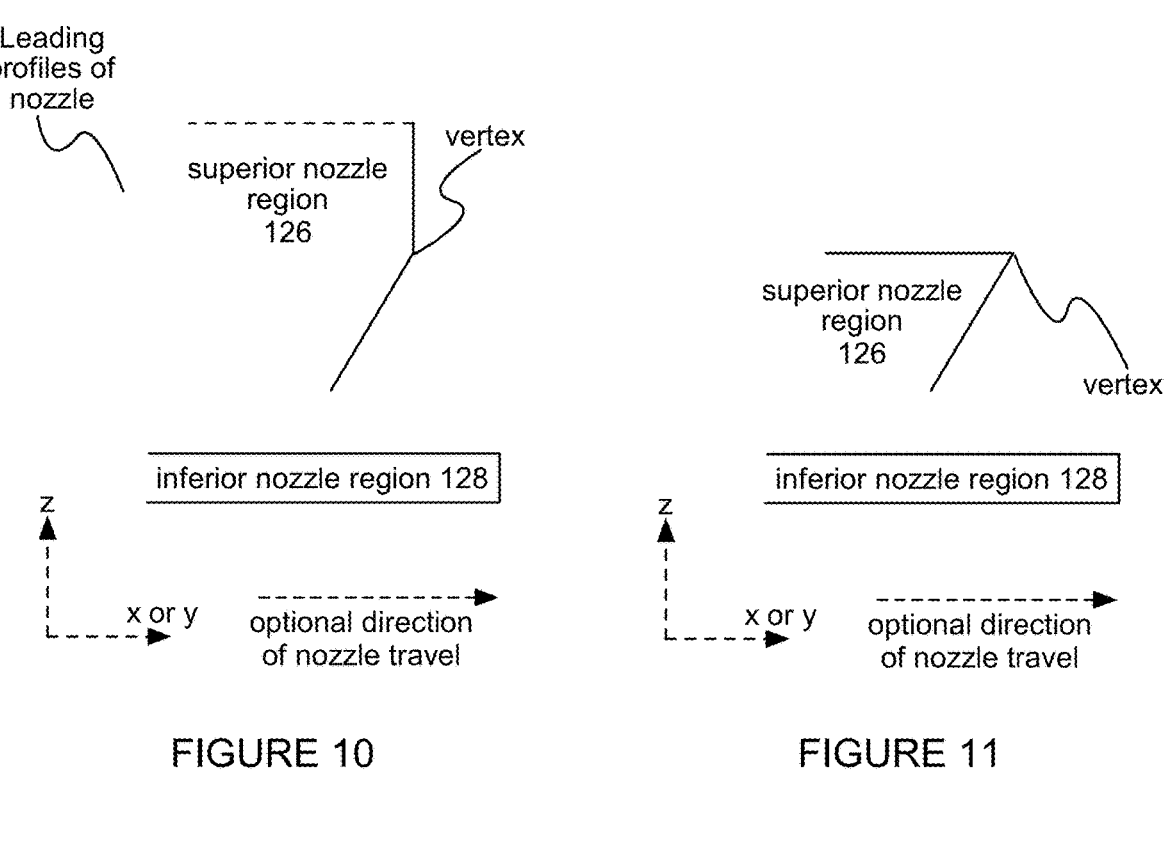
Figures 12, 13:
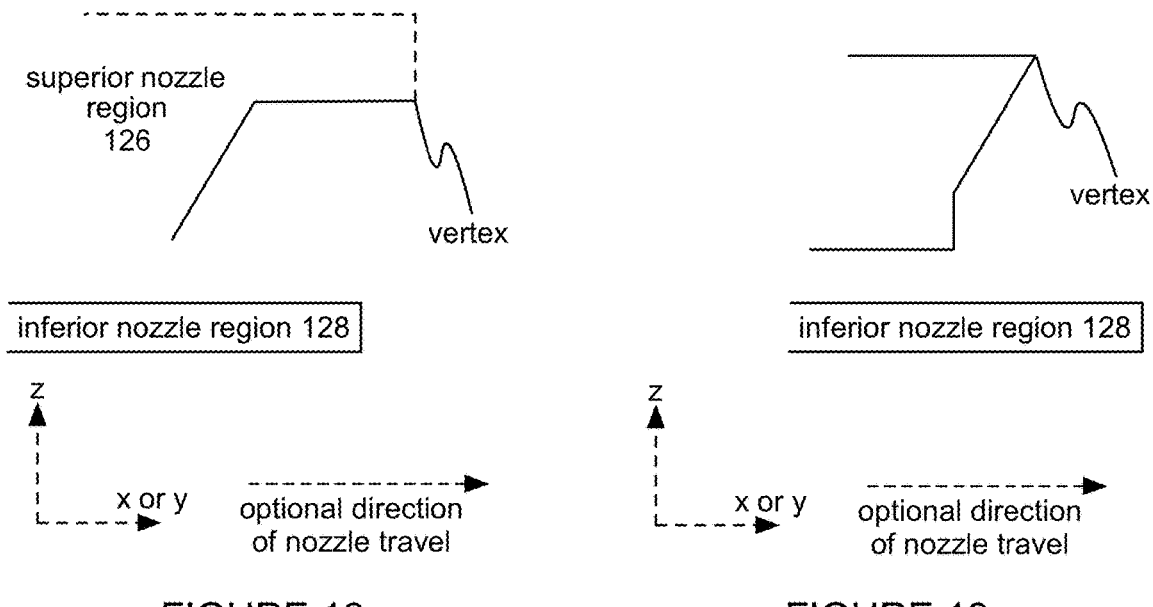
Figure 14A:
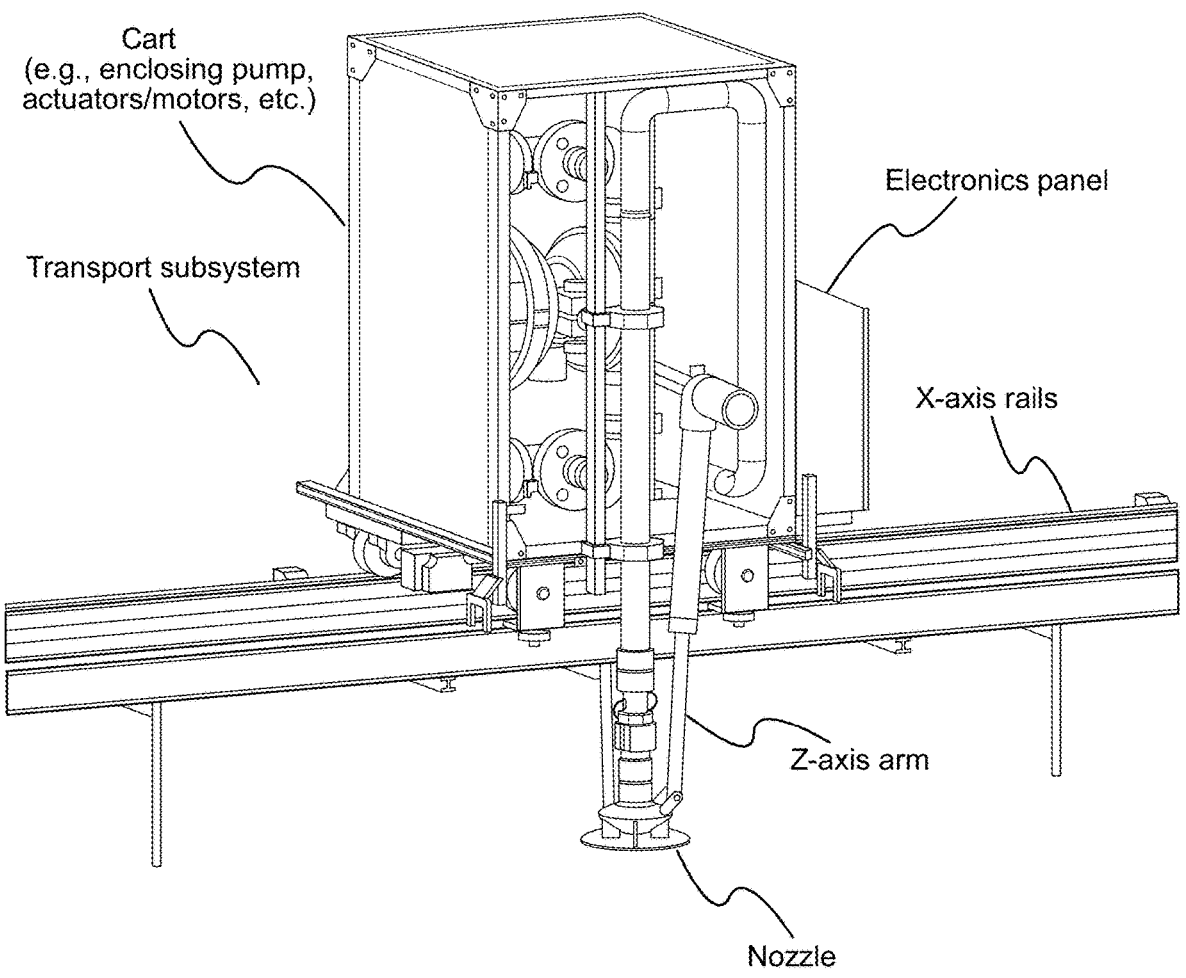
FIGS. 14A-14E depict an example of a transport subsystem.
Figure 14B:
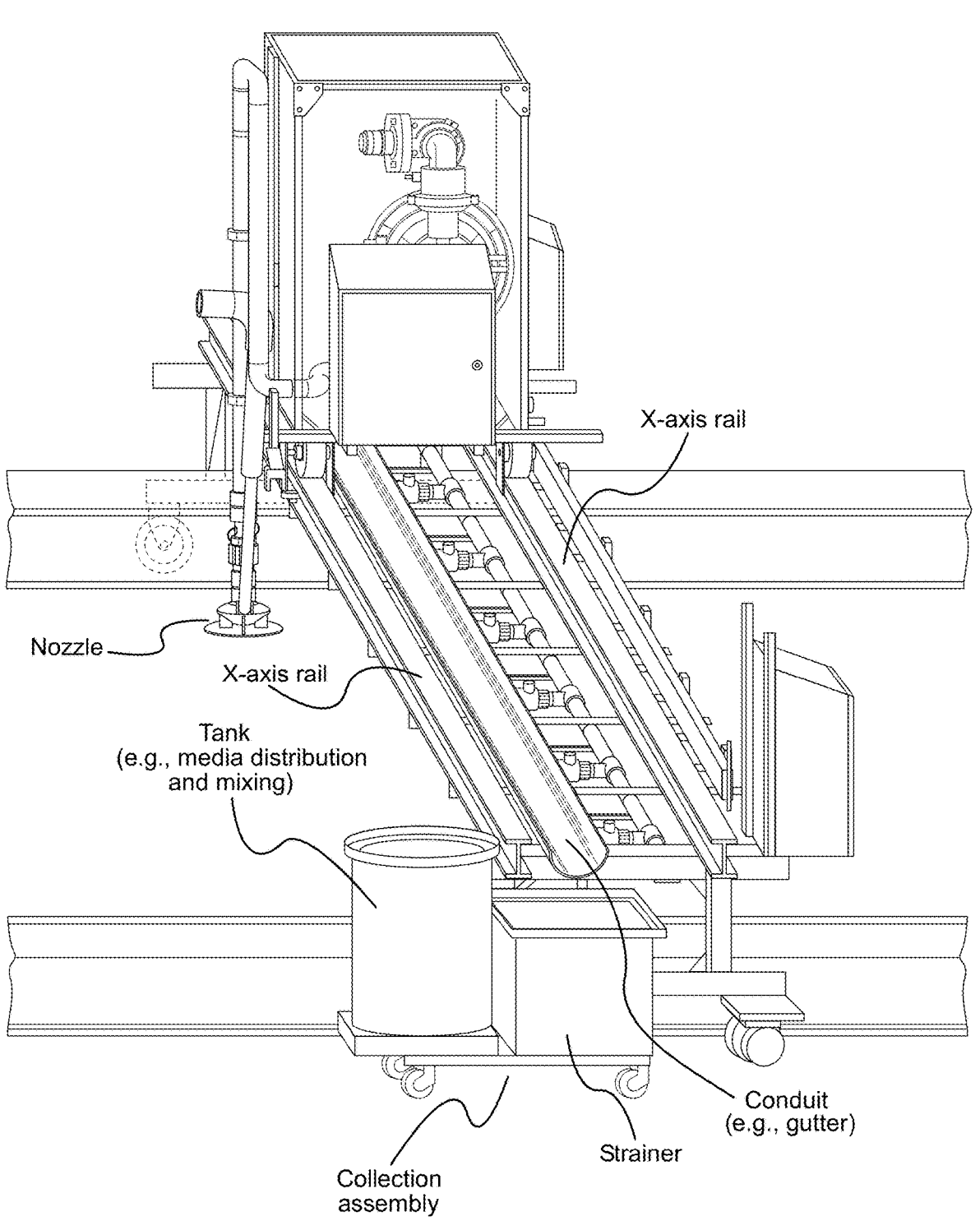
Figure 14C:
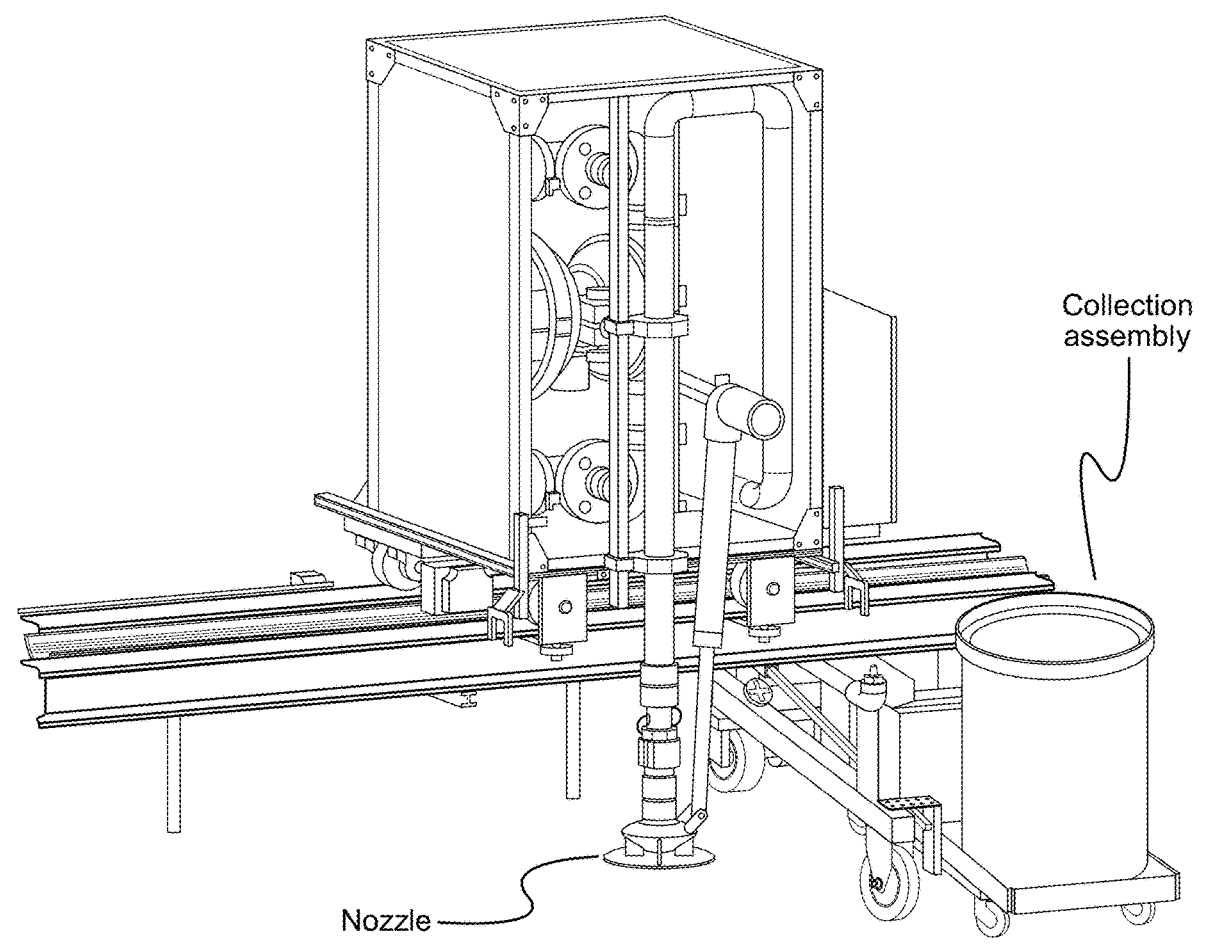
Figure 14D:
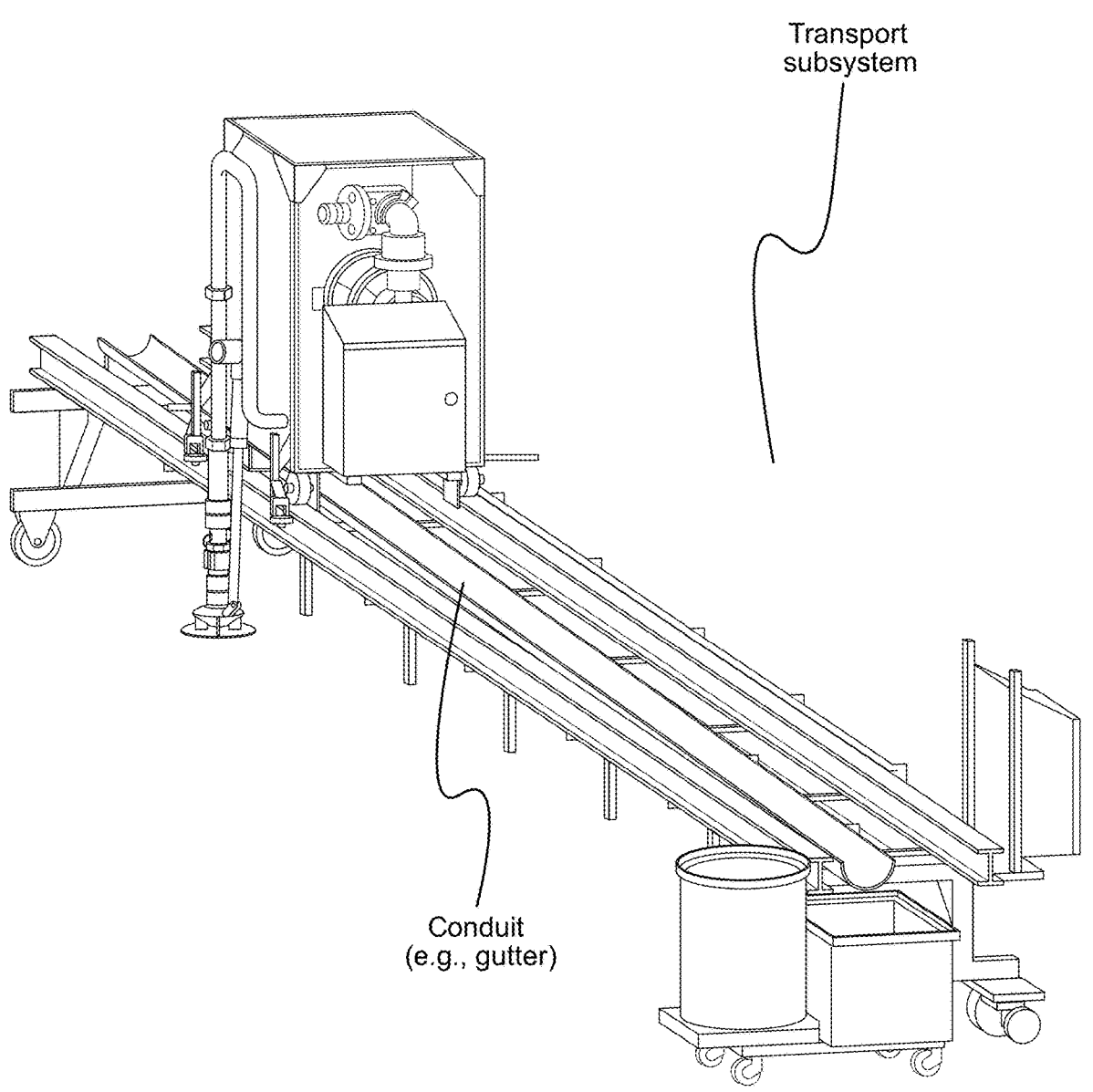
Figure 14E:
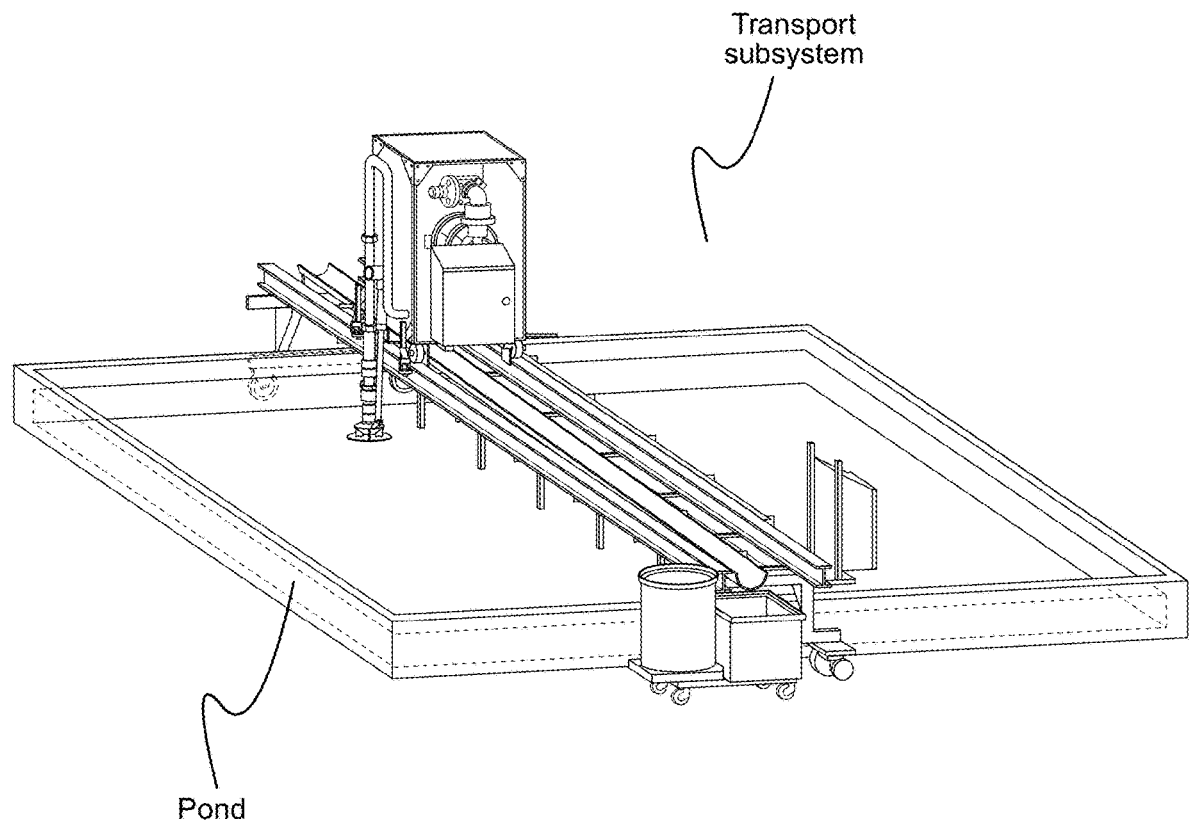

In preferred variations, a leading profile (equivalently a leading cross section) of the nozzle, which herein refers to a partial profile of the nozzle corresponding to the direction of nozzle travel (e.g., right side of nozzle for nozzle travel to the right), is defined by one or more sloped regions (e.g., as depicted in the schematic leading profiles shown in FIGS. 5, 7, 8, 9-13). In additional or alternative variations, a leading profile can include any or all of: curved regions (e.g., as shown in FIGS. 6-8), horizontal regions (e.g., as shown in FIGS. 10-13), vertical regions (e.g., as shown in FIGS. 10, 12, 13), and/or any other profile geometries.

The nozzle can optionally (e.g., through the superior region and/or inferior region, in absence of a superior region and/or inferior region, through a superior broad surface of the nozzle, etc.) encourage a directionality of collection of the aquatic plants, such that the plants are primarily collected along a major direction. This can function, for instance, to prevent overharvesting of a particular region of the pond (e.g., by controlling a directionality) and/or encourage even spreading of the aquatic plants remaining after the harvest. The major direction is preferably parallel to and opposite the direction of nozzle movement in variations in which the nozzle moves along a rail and/or other suitable transport subsystem (e.g., trackless wheels, tension cable, etc.), but can additionally or alternatively define and/or enable an otherwise oriented major direction.

The nozzle can optionally additionally or alternatively include a fin and/or tail which functions to orient the nozzle, preferably in a direction parallel to a direction of movement of the nozzle, but additionally or alternatively in any suitable direction. The fin and/or tail is preferably attached to the remaining nozzle assembly with a swivel bearing, wherein the swivel bearing functions to enable dynamic orientation of the nozzle, which can be analogous, for instance, to a yaw/tail vane of a windmill, which functions to orient the windmill based on an orientation of the wind. The fin and/or tail is preferably used in accordance with a nozzle as described above which encourages a directionality of collection, but can additionally or alternatively be used in combination with any other nozzles.

Figure 22:
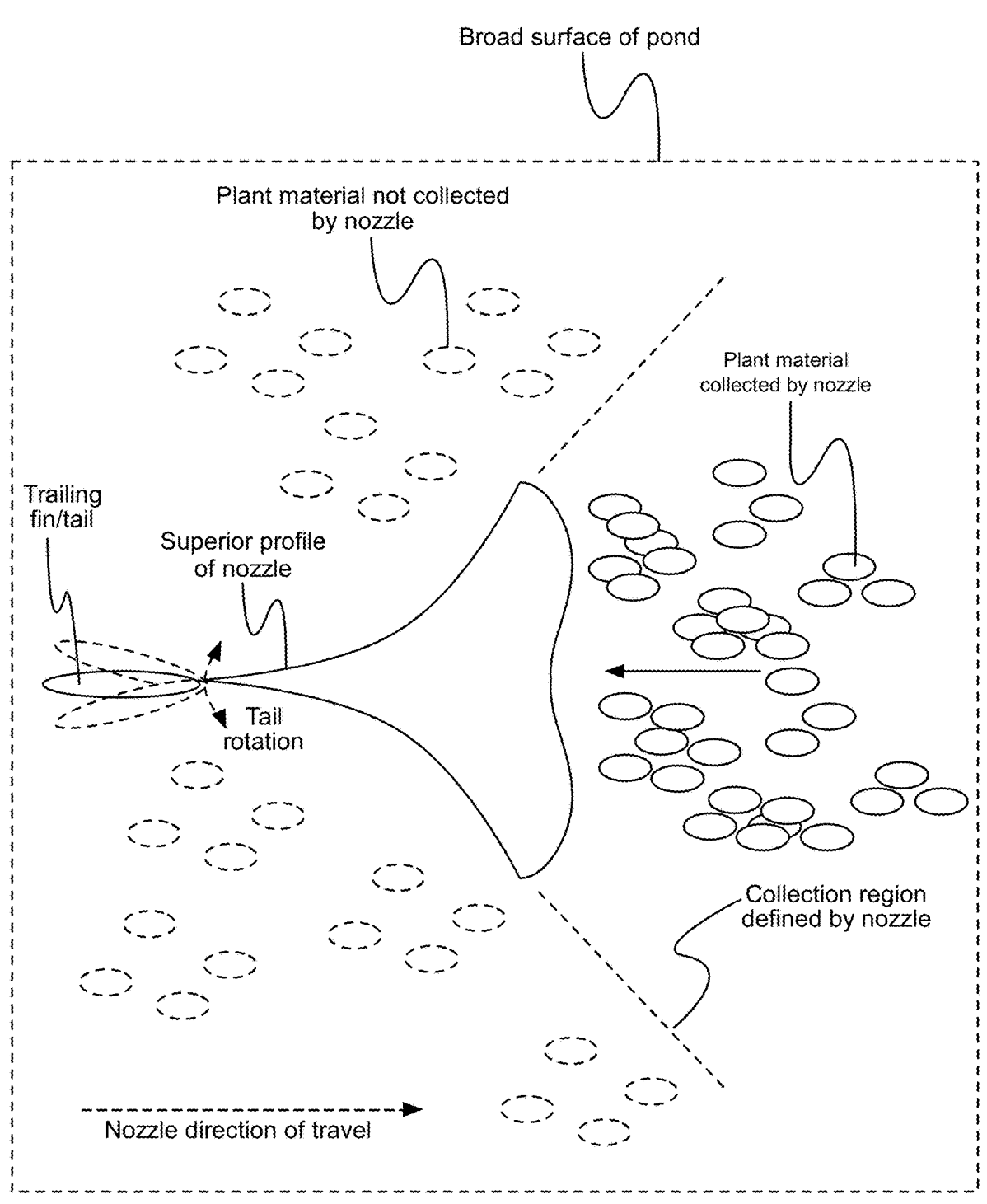
FIG. 22 depicts a schematic variation of a superior profile of a nozzle.

In some variations, as shown in FIG. 22, for instance, the nozzle defines a superior profile which functions to collect plant material indicated with solid outlines from within a directional region as indicated by the dotted lines, which effectively allows only materials from the front of the nozzle to be drawn to the opening and harvested. The nozzle can optionally further include a trailing fin as shown in FIG. 22, which can function to guide the nozzle direction in alignment with the flow of materials into the inlet. Additionally or alternatively, the nozzle can be otherwise configured and/or arranged.

The nozzle assembly can include a nozzle support, which functions to maintain the nozzle at a set of orientations (e.g., angular orientations) and/or placements (e.g., heights) relative to the pond surface, which can subsequently function to enable any or all of: optimal collection (e.g., greatest volume, minimal breakage, fastest collection, etc.) of plant material (e.g., based on an optimal angle, based on an optimal height relative to a pond surface, etc.), movement of the nozzle (e.g., up and down in the z-direction, along the x-y plane, etc.), and/or any other characteristic.

Further additionally or alternatively, the nozzle support can function to enable any or all of: compensating for vertical height changes of the nozzle relative to the pond surface (e.g., by having an inlet height which can still collect biomass given perturbations in height, by physically moving the nozzle in the z-direction, etc.) resulting from rail deflection of the gantry (e.g., between 0 mm and 150 mm of vertical height change, between 20 mm and 80 mm of vertical height change, between 30 mm and 70 mm of vertical height change, up to 150 mm of vertical height change, greater than 150 mm of vertical height change, etc.); compensating for variation in plant height above the pond surface; controlling (e.g., minimizing) a degree of tilt of the nozzle relative to the gantry (e.g., allow for no more than 10 mm of tilt at the nozzle interface); adjusting the nozzle to height deviations within a predetermined response time (e.g., between 0 and 5 seconds, between 0 and 10 seconds, between 10 and 20 seconds, greater than 20 seconds, etc.), maintaining an airtight seal between the nozzle and a vacuum/pump actuator; and/or performing any other suitable function.

The nozzle support can include and/or be configured to interface with a set of one or more nozzle actuators, which function to move the nozzle along a z-axis (e.g., into and out of a pond) and optionally any other axes (e.g., x-axis, y-axis, etc.). Additionally the nozzle actuator can function to rotate the nozzle (e.g., through one or more motors), and/or perform any other suitable function(s).

In some variations, the nozzle actuator enables a nozzle to be operated in a set of operation modes, such as any or all of: a stowed mode wherein the nozzle is out of the pond, and an engaged mode, wherein the nozzle is deployed to one or more particular heights (e.g., wherein adjustments to the height are made based on actual or predicted rail deflection) and/or one or more particular orientations configured to collecting plant material during harvesting. The set of operation modes can include any number of additional modes, such as any or all of: a dredge mode (e.g., wherein the nozzle is deployed to a depth within the pond to contact/dredge the bottom surface of a pond), a rinse mode (e.g., wherein the nozzle is deployed to a depth below the surface to rinse off plant material, wherein the nozzle is fully or partially submerged, etc.), and/or any other suitable modes.

In some variations, additional or alternative to those described above, a sensor subsystem of the system (e.g., as described below) includes a position sensor (e.g., potentiometer, hall effect sensor, external height sensor feeding into the controller) to provide position feedback to adjust the height (z-direction) of the nozzle (e.g., based on rail deflection, variations in plant height above the surface, etc.). The position sensor can be located on any or all of: the nozzle assembly, the rail subsystem, the pond, and/or any other suitable components and/or combination of components. Additionally or alternatively, any other suitable sensors can be used to determine height parameters, such as, but not limited to: a moisture sensor (e.g., to determine if a particular region of the nozzle is in contact with the pond), an optical sensor (e.g., to determine where the surface of the pond is relative to the nozzle), a temperature sensor (e.g., to determine where the surface of the pond is relative to the nozzle), a strain gauge (e.g., to determine deflection of the rail subsystem), and/or any other suitable sensors.

In specific examples, the sensor subsystem includes one or more sensors configured to enable control (e.g., with the control subsystem) of the inlet height relative to the surface of the pond, such that in regions in which this changes (e.g., due to beam deflection of the rail subsystem), the nozzle can be moved up or down accordingly (e.g., to maintain a consistent displacement relative to the pond surface, to ensure that at least a portion of the inlet is arranged at the pond surface, to ensure that at least a portion of the inlet is arranged below the pond surface, to ensure that at least a portion of the inlet is arranged above the pond surface, etc.). Additionally or alternatively the inlet can be sized (e.g., oversized in height) to account for these changes.

Additionally or alternatively, the changes in height due to structural and/or beam deflection can be predetermined and the nozzle movement can be controlled to compensate accordingly.

In a first variation, the nozzle of the nozzle assembly (e.g., as shown in FIGS. 15A-15B), includes a nozzle configured to collect materials from a 360-degree range or the majority of a 360-degree range, wherein a superior region of the nozzle includes a frustoconical interior portion defining a first slope, wherein the frustoconical interior portion defines a set of one or more inlets arranged circumferentially around the nozzle configured to collect materials from the pond, and wherein the nozzle includes an inferior region arranged inferior of the inlets configured to prevent materials inferior to the nozzle from entering the inlets.

In a first set of specific examples, each of the superior and inferior regions defines a straight sloped profile.

In a second set of specific examples, each of the superior and inferior regions defines a curved profile.

In a third set of specific examples, one of the superior and inferior regions defines a straight sloped profile and the other region defines a curved profile.

Figure 21:
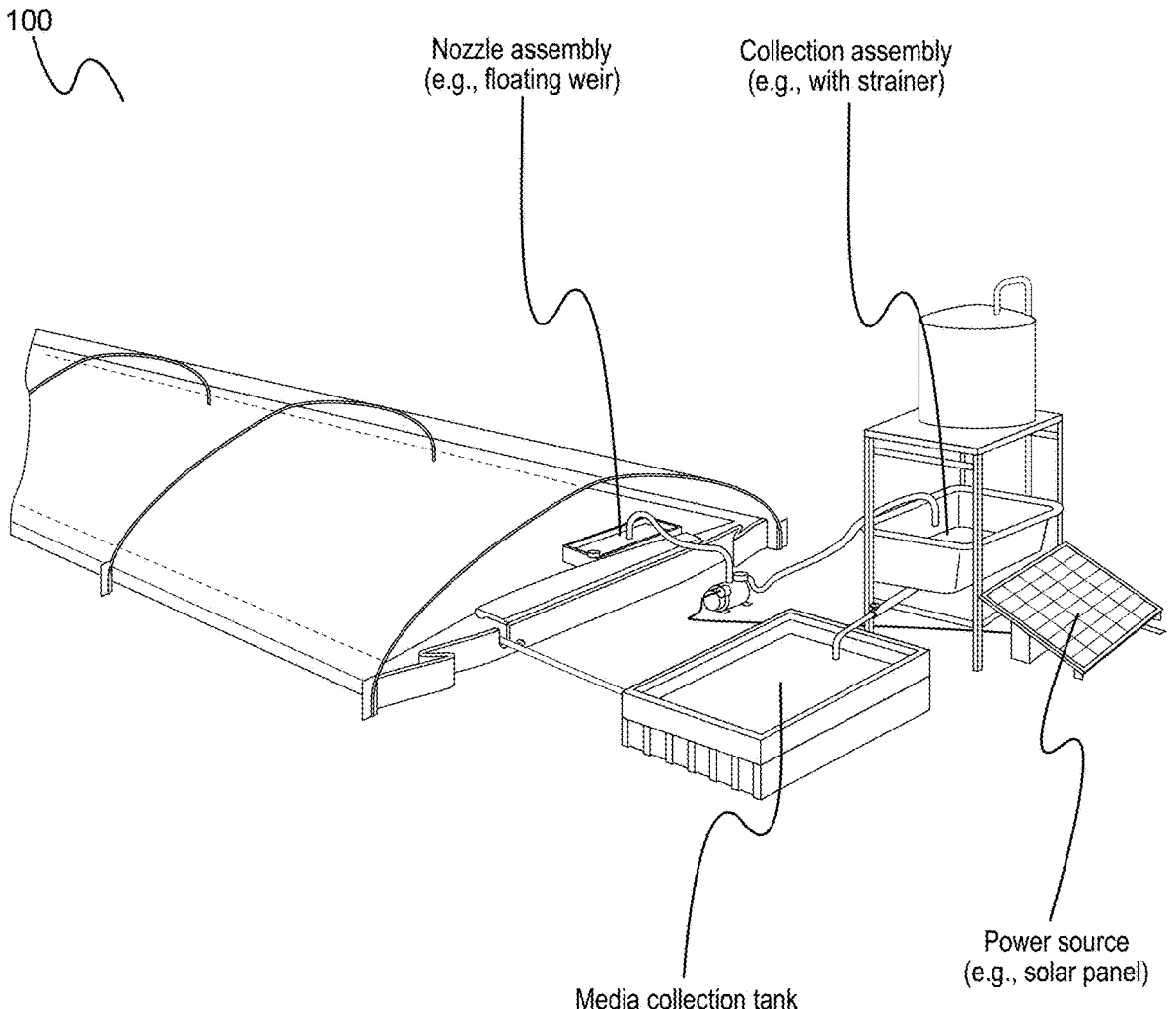
FIG. 21 depicts a variation of the system.

In a second variation, the nozzle of the nozzle assembly includes a floating weir skimmer (e.g., as shown in FIG. 21), wherein the floating weir skimmer collects material while floating on a surface of the pond. In specific examples, the floating weir skimmer is configured to collect materials from a 360-degree range and/or the majority of a 360-degree range (e.g., between 270 and 360 degrees, between 300 and 360 degrees, between 330 and 360 degrees, etc.).

In a third variation, the nozzle of the nozzle assembly is absent of the superior region.

In a fourth variation, the nozzle of the nozzle assembly is absent of the inferior region.

3.3 System—Pump Assembly 130

The harvester 110 can include a pump assembly 130 (equivalently referred to herein as a vacuum), which functions to collect plant material (e.g., aquatic plants) through the nozzle inlet and transport it to a gutter (e.g., via a pump-gutter outlet as described below).

The pump assembly can be configured to achieve any or all of: a predetermined plant:water ratio or range of ratios; a predetermined air:plant:water ratio or range of ratios; a flow rate above a predetermined threshold (e.g., to harvest a weight or value of plant material in a target harvest time); a flow rate below a predetermined threshold (e.g., to prevent breakage of plant material); and/or can achieve any other suitable parameters.

The pump assembly preferably includes a pump with a shear below a predetermined threshold (e.g., a low shear pump, reciprocating pump, diaphragm pump, piston pump, plunger pump, rotary pump, a vacuum, a screw-type conveyer/auger, etc.), such as one or more diaphragm pumps (e.g., continuous operation diaphragm pump with passive valves). Additionally or alternatively, any other suitable pumps can be used (e.g., one or more centrifugal pumps).

The pump assembly 130 can include one or more pump-conduit outlets, which functions to interface with one or more conduits (e.g., gutters) of the system (e.g., as described below). The pump-conduit outlet preferably further functions (e.g., collectively with the conduit and/or pump assembly) to direct materials (e.g., plants, plant-water mixture, etc.) to the conduit with less than a predetermined threshold of material loss (e.g., less than 10%, less than 5%, less than 1%, etc.), which can occur for instance given variations in cart height and/or a decreasing slope of the conduit. In preferred variations, for instance, a mobile pump-assembly (e.g., mobile during a harvest) interfaces with a stationary or partially stationary gutter. In some variations, for instance, a mobile pump assembly deposits material into a gutter having a length at least as great as the dimension traveled by the mobile pump assembly (e.g., in a single pass along an x-direction, in a single pass along a y-direction, etc.), wherein the gutter is stationary relative to the nozzle (e.g., during a pass of the mobile pump assembly).

In a first variation, the pump assembly includes a diaphragm pump which receives materials collected at the nozzle and outputs them to one or more gutters (e.g., as described below) through a pump-gutter outlet.

In a second variation, the pump assembly includes a vacuum which receives materials collected at the nozzle and outputs them to one or more gutters (e.g., as described below) through a pump-gutter outlet.

Additionally or alternatively, the pump assembly can include any other suitable components.

3.4 System—Transport Subsystem 140

The system 100 can include a transport subsystem 140, which functions to enable movement of the nozzle assembly and/or pump assembly around the harvesting region (e.g., pond surface). Additionally or alternatively, the transport subsystem can function to support height changes of the nozzle and/or pump assemblies, enable movement of other suitable components of the system, enable movement of system components among multiple ponds, and/or perform any other suitable functions.

The transport subsystem 140 includes a frame, such as a truss and/or a gantry, wherein the frame supports the nozzle assembly and enables the nozzle assembly (and/or any other components of the system 100) to traverse part or all of the harvesting region (e.g., entire surface area of pond). The frame further preferably functions to support one or more gutters.

The frame is preferably made of one or more rigid materials (e.g., metal, steel, aluminum, wood, plastic, rigid polymer, fiberglass, titanium, carbon fiber, etc.), such that the frame experiences minimal or no sagging under the weight of the components supported by the frame. Additionally the materials of the frame are preferably resistant to corrosion and biological contamination (e.g., rust). Additionally or alternatively, the frame can be constructed from any other suitable materials.

In preferred variations, the frame includes a set of I-beams.

Figure 3:
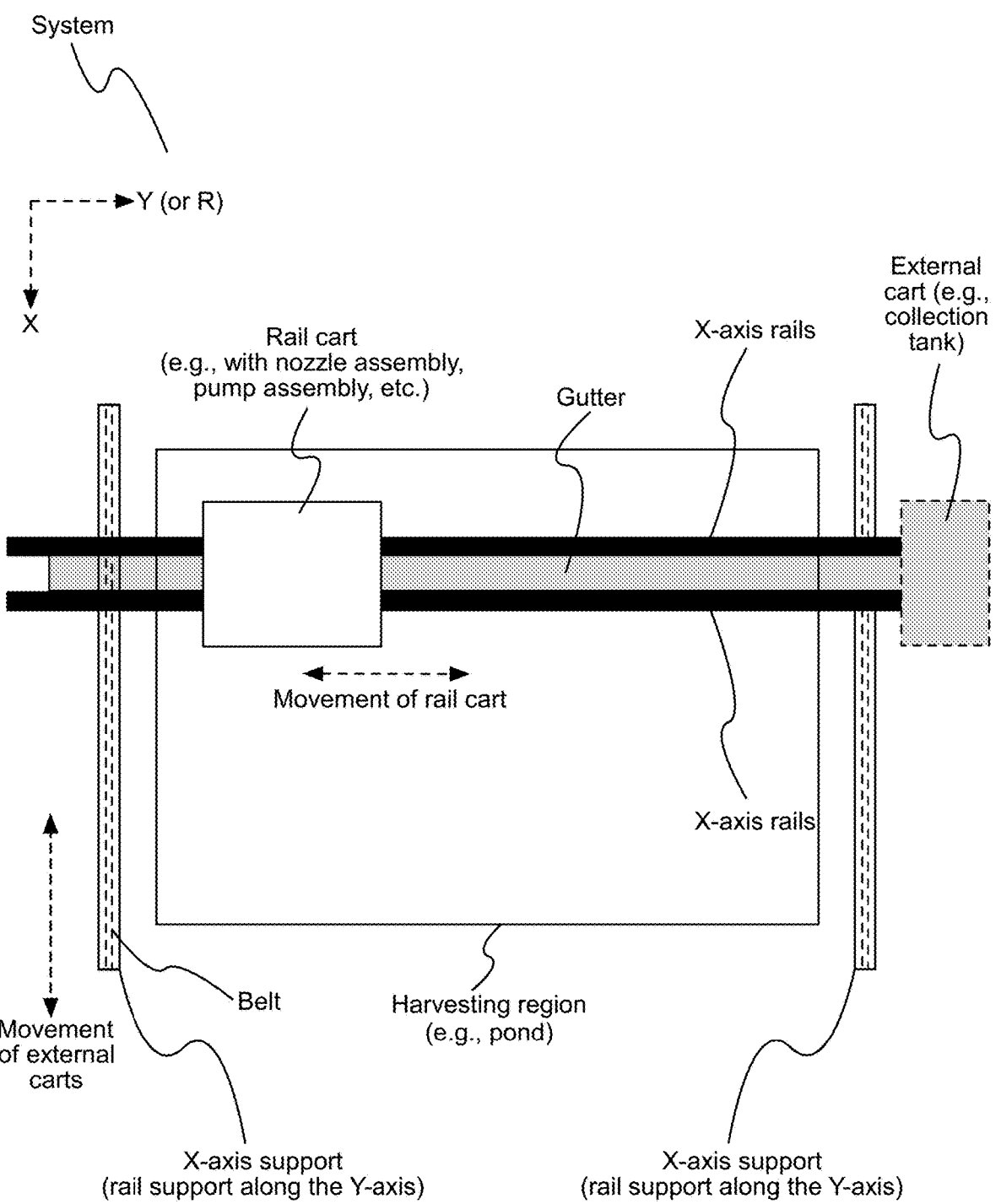
FIG. 3 depicts a variation of an aquatic plant harvesting system.
Figure 4:
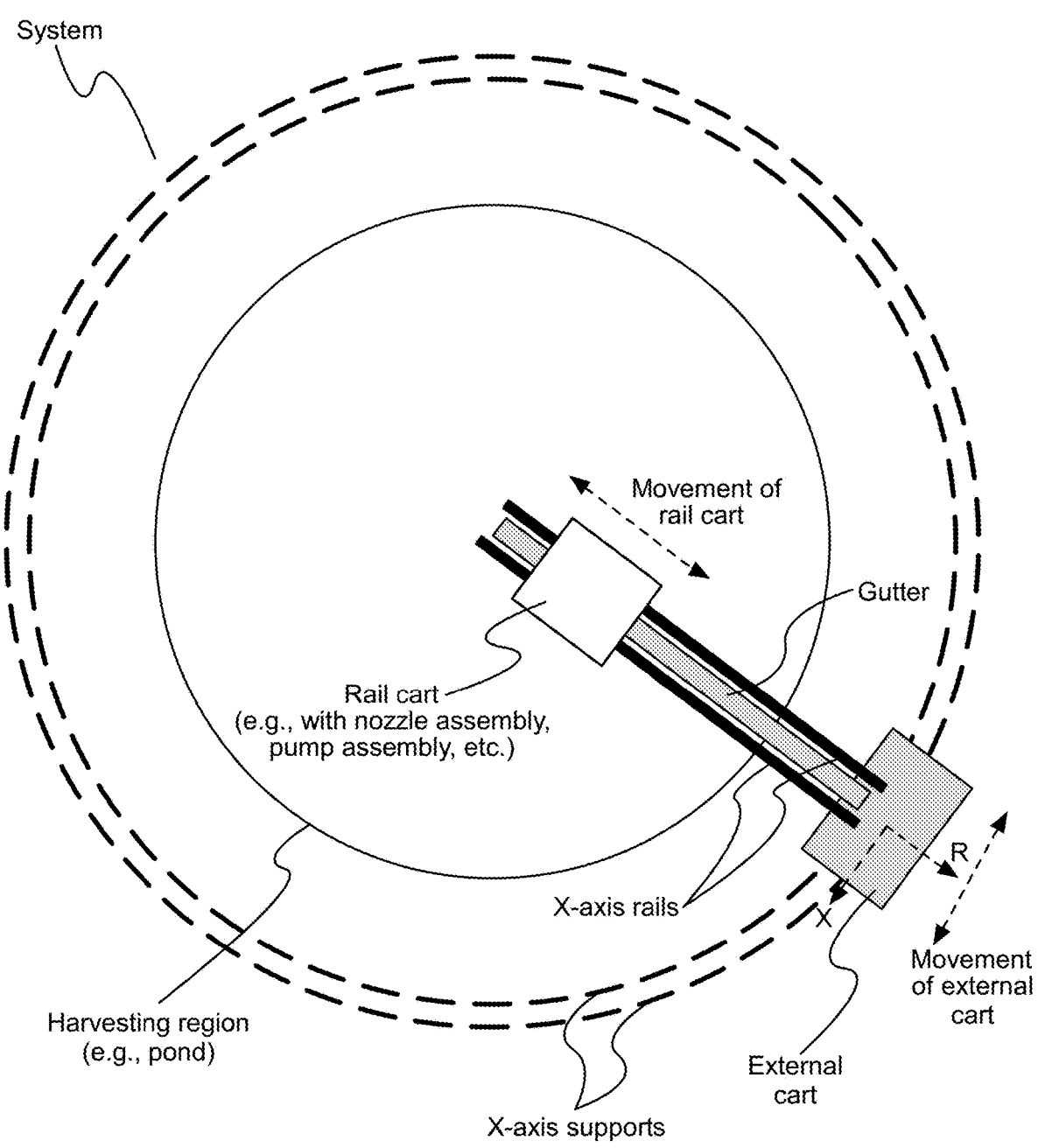
FIG. 4 depicts a variation of an aquatic plant harvesting system.

The frame preferably includes a rail subsystem, which enables movement of the nozzle assembly along a surface of the harvesting region (e.g., along an X-Y plane of a pond, along an X-R plane, etc.). In preferred variations, the rail subsystem includes a first axis rail (e.g., X-axis rail, Y-axis rail, etc.), wherein the first axis rail moves along the first axis through a set of rail supports (e.g., X-axis supports in FIGS. 3, 4, 17E) arranged external to the harvesting region. The rail supports preferably include a continuous track (e.g., band, belt, continuous track of tread, continuous track of track plates, chain track, etc.) configured to move the first axis rail (e.g., based on commands of the control subsystem), but can additionally or alternatively move the first axis rail in any other suitable way. In additional or alternative variations, the system can include no rail supports, multiple rail supports, and/or any combination and/or arrangement of rail supports.

Additionally or alternatively, one or more nozzles and/or nozzle assemblies can be stationary relative to the frame and/or rail subsystem. In some variations, for instance, the nozzle assembly includes multiple nozzles (e.g., 2, 4, 8, 10, between 2 and 8, more than 10, etc.), wherein the multiple nozzles are fixed to the rail, wherein movement of the rail transports the nozzles along the surface of the pond.

Further additionally or alternatively, a nozzle assembly (e.g., and associating cart) can move with trackless wheels and/or a tension cable as motion guidance rather than and/or in addition to moving along the tracks of one or more rails.

In variations including floating weirs for nozzles, the floating weirs are preferably coupled to (e.g., fixed to, fixed to with rotation abilities, etc.) but can additionally or alternatively be free floating and/or coupled to any other components of the system.

The transport subsystem can optionally include one or more carts, which function to support components of the system. The carts can include one or more external carts (e.g., wheeled carts) arranged outside of the harvesting region (e.g., adjacent to pond walls), which move with the first axis rail (e.g., through coupling with the first axis rail, through coupling with the first axis supports, based on independent movement, etc.) and preferably functions to support one or more components of a collection assembly (e.g., as described below), wherein the external cart moves with the first axis rail (e.g., such that the external cart can continuously receive materials from a gutter coupled to the first axis rail). The external carts are preferably arranged outside of the harvesting region (e.g., along an edge), but can additionally or alternatively be within (e.g., running along the pond floor) or partially within (e.g., floating on a pond surface of) the harvesting region. The set of carts preferably further includes one or more rail carts which support at least the nozzle assembly (e.g., with the pump assembly), wherein the rail cart moves along the X-axis rail. The rail cart (and/or the external cart) can include any or all of: a drive wheel, a belt drivetrain, a set of motors, and/or any other suitable actuators configured to move (e.g., translate, rotate, etc.) the cart (e.g., based on commands from a control subsystem).

The carts can additionally or alternatively function to transport the system among multiple ponds. In specific examples wherein the system tends to multiple ponds, the nozzle can be retracted over a pond wall and transported over a second pond wall to harvest in the second pond.

In variations including a rectangular harvesting region (e.g., as shown in the bird's eye view of FIG. 3), the rail subsystem can include a set of rail supports (X-axis supports) arranged perpendicular to the X-axis rail, which functions to guide translation of the X-axis rail along the X-axis supports in the X-direction. The nozzle assembly moves in the Y-direction along the X-axis rail. Collectively, through the movement of the X-axis rail and the movement of the nozzle assembly along the X-axis rail, the nozzle assembly is able to traverse the surface of the harvesting region. The carts are preferably configured to be operated (e.g., by the control subsystem) to maintain a predetermined lateral accuracy (e.g., within 50 mm of target location, within 30 mm of target location, within 10 mm of target location, within between 5 mm and 100 mm of target location, below a degree angle threshold, etc.) as it moves and to implement a safety stop if the vehicle approaches too close to the harvesting region (e.g., pond walls).

In variations including a circular harvesting region (e.g., as shown in the bird's eye view of FIG. 4), the rail subsystem includes an X-axis rail which rotates about a central axis of the circular harvesting region, wherein the nozzle assembly moves along the X-axis rail in the direction of an R-axis. The rail subsystem can optionally include a circular rail support that functions to guide rotation of the X-axis rail.

Additionally or alternatively, the transport subsystem can include a belt and/or pulley system (e.g., in a drivetrain format), which moves a nozzle assembly and/or any other components of the system across a surface of the pond, such as through the rotation of a drive wheel. Additionally or alternatively the nozzle assembly itself can move (e.g., through a motorized nozzle), wherein the belt and/or rope functions to guide the direction of the nozzle.

Figure 20:
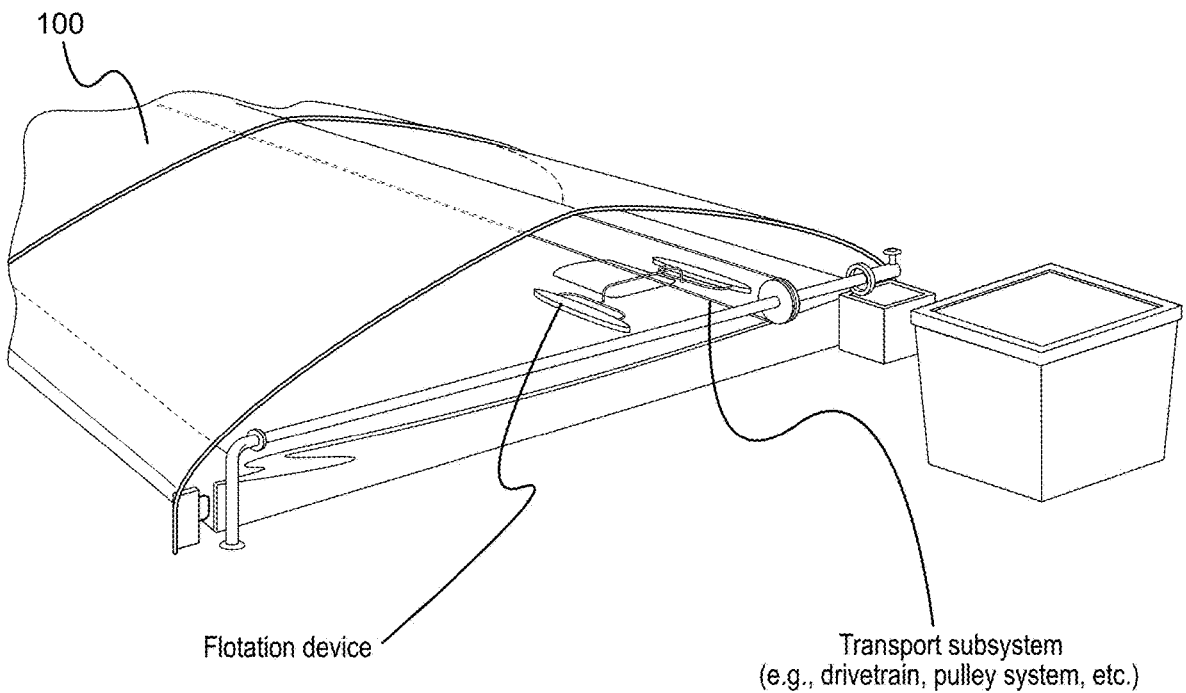
FIG. 20 depicts a variation of the system.

In some variations (e.g., as shown in FIG. 20), a drive train and/or drive wheel assembly is used for the transport subsystem, which functions to transport a nozzle assembly (e.g., with flotation devices) along a surface of the pond.

Figure 17:
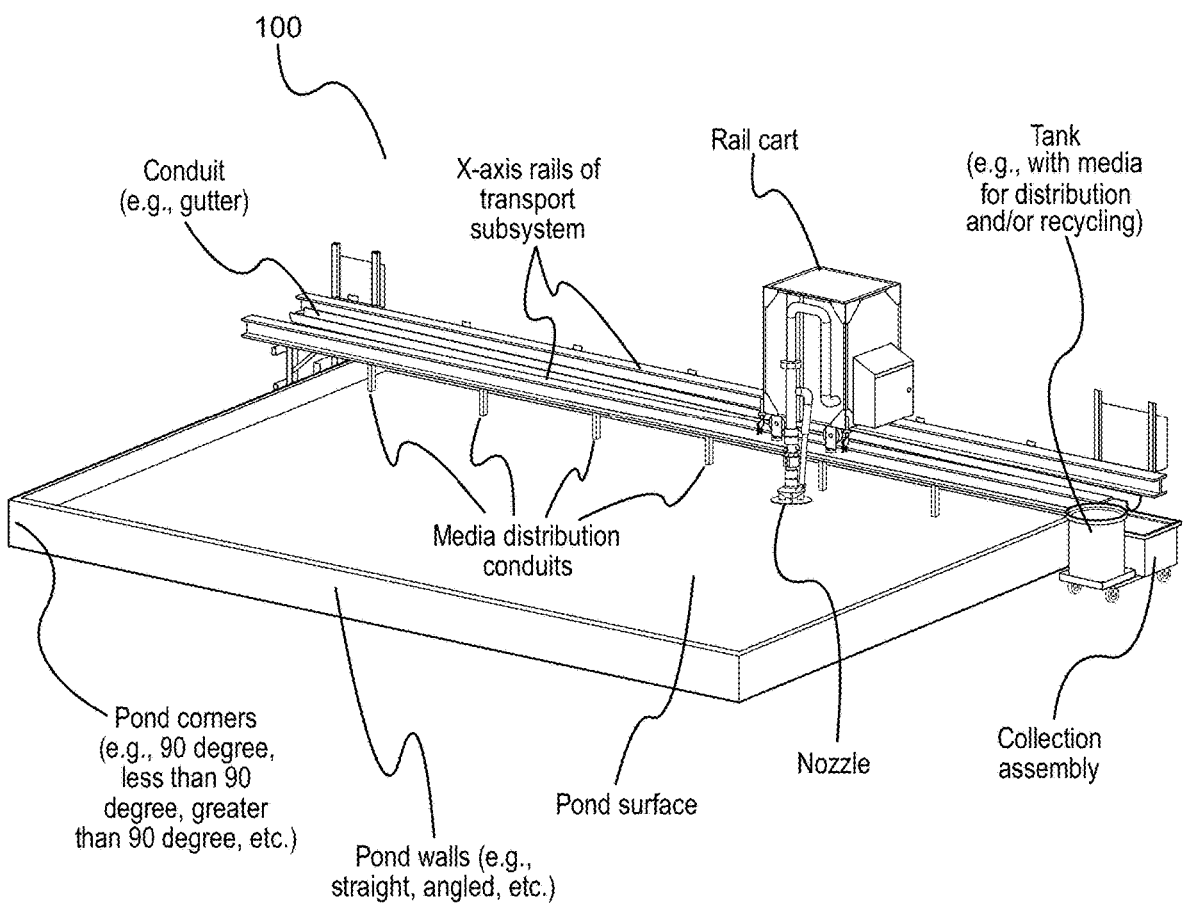
FIG. 17 depicts a variation of the system.

The system can optionally include a media distribution subsystem, which can function to perform any or all of: dispensing media into a pond (e.g., with even distribution); mixing media within the pond; collecting media and/or other materials from the pond; and/or performing any other function. The media distribution subsystem can be part of the frame, separate from the frame (e.g., fixed to the pond), and/or otherwise arranged (e.g., independently of other components). The media distribution system is preferably mobile (e.g., fixed to a moving rail of the frame), which can function to minimize a size and/or complexity of the subsystem (e.g., as it can apply media to the whole pond by moving), but can additionally or alternatively be static (e.g., a static network of pipes and/or tubes within the pond). The media distribution subsystem preferably includes a set of conduits (e.g., tubes), wherein the conduits can be any or all of: flexible, rigid, perforated (e.g., such that media is distributed across a length of the tube), non-perforated (e.g., such that media is distributed from an end opening of the tube), and/or otherwise configured. In a first set of variations (e.g., as shown in FIG. 17), the media distribution subsystem includes a set of tubes (e.g., flexible tubes, rigid tubes, etc.) fixed to the first axis rail which travel with the first axis rail (e.g., without ripping/disturbing the pond floor), wherein the ends of each tube are arranged sub-surface during harvesting and/or in any other operation modes. In a second set of variations, the media distribution subsystem is fixed to the pond, such as a pipe network fixed to a bottom surface of the pond. In specific examples, the media distribution subsystem includes a pipe network (e.g., single pipe, multiple pipes, etc.) that runs the length of the pond and distributes media.

In a first variation, the transport subsystem 140 includes a rail subsystem including a first axis rail configured to move in a first direction (e.g., along a length of a pond, along a width of a pond, etc.); a rail cart configured to move along the first axis rail in a second direction perpendicular to the first direction, wherein the rail cart supports the nozzle assembly, the pump assembly, and electronics associated with the portion of the control subsystem onboard the rail cart; a rail support system including a set of tracks configured to move (e.g., translate, rotate, etc.) the first rail axis in the first direction; and one or more external carts coupled to the rail subsystem (e.g., to the first rail axis, to a rail support, etc.).

3.5 System—Conduit 145

The system 100 can include a conduit 145, which functions to receive the plant material collected by the nozzle assembly via the pump assembly. The conduit 145 preferably further functions to transport the plant material to a collection assembly (e.g., as described below).

The conduit preferably conveys and/or transports materials (e.g., plant biomass) passively, such as through any or all of: an open-top gutter; an unpressurized tube, pipe, and/or hose; and/or through any suitable conduits. Additionally or alternatively, the conduit can convey and/or transport materials actively, such as through a tube and/or pipe and/or hose which is pressurized (e.g., using a pump).

The conduit is preferably coupled to the transport subsystem 140, further preferably connected to the first axis rail. In preferred variations, for instance, the conduit runs along the length of the X-axis rail and arranged inferior to a pump-conduit outlet, such that materials collected at the pump assembly fall into the conduit. The conduit is preferably fixed to the X-axis rail such that the conduit moves with the X-axis rail and is stationary relative to movement of the rail cart including the nozzle assembly, but can additionally or alternatively move with the rail cart and/or be otherwise arranged (e.g., arranged at another component of the transport subsystem, coupled to a harvesting region structure such as a pond wall, coupled to a rail support, etc.).

Materials entering the conduit are preferably transported along the conduit at least partially through gravity (e.g., passively transported). As such, the conduit is preferably arranged with a nonzero downward pitch (e.g., 1 degree pitch, between 1 and 5 degree pitch, between 5 and 10 degree pitch, greater than 10 degree pitch, etc.) relative to the location of the rail cart during harvesting, such as a constant pitch, variable pitch (e.g., increasing pitch along length, decreasing pitch along length, etc.), and/or any other suitable pitch. The value of the pitch is preferably configured to achieve a predetermined flow rate or range of flow rates within the conduit (e.g., below a predetermined threshold to prevent materials from flowing over sides, to prevent collection assembly from being overfilled, prevent more than 0.5% plant loss, etc.), but can additionally or alternatively be otherwise configured. Additionally or alternatively, any or all of the conduit can be arranged with a zero pitch (e.g., at a portion of the gutter, horizontal orientation, vertical orientation, etc.), an upward pitch, and/or any combination of pitches.

Additionally or alternatively, the conduit can include any number of active components configured to pass materials along the conduit (e.g., in combination with a pitch of the gutter, in absence of a pitch of the gutter, etc.), such as any or all of: jets, rollers, tracks or bands, vacuum, augers, conveyors, and/or any other suitable components.

In a first variation (e.g., as shown in FIGS. 14A-14E, 17), the conduit is a gutter which is fixed to and runs along the length of an X-axis rail (e.g., which translates along X-axis supports in a rectangular harvesting region, which rotates as a radius of a circular harvesting region, etc.), wherein the gutter receives materials collected at the nozzle assembly via a pump-gutter outlet and transports the materials to a collection assembly 150.

Figure 18:
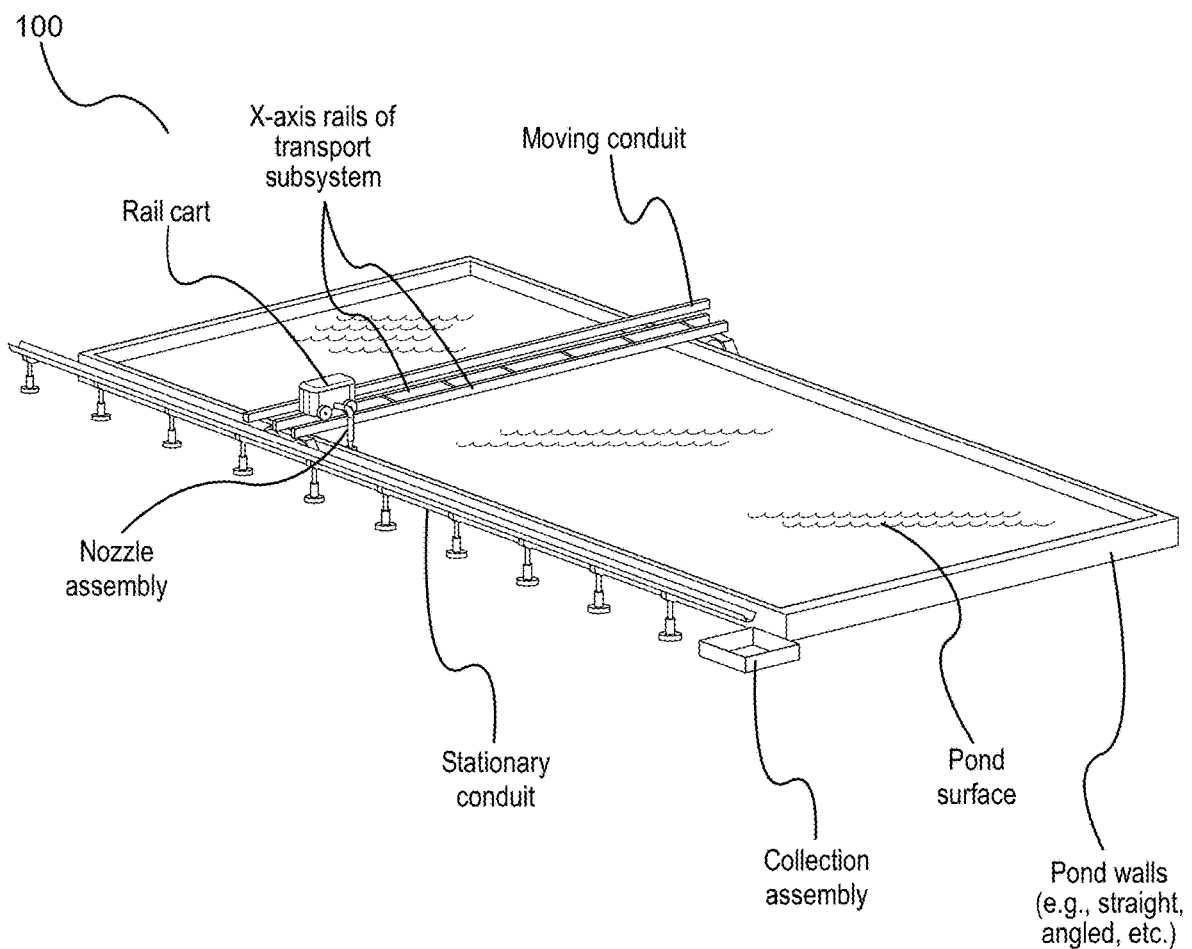
FIG. 18 depicts a variation of the system.

In a second variation, multiple conduits are used. In specific examples (e.g., as shown in FIG. 18), plant biomass is transported along the length of an X-axis rail into an open-top gutter, which then transports the biomass along an R-axis and/or Y-axis to a collection assembly 150.

In a third variation, the conduit is a set of one or more tubes coupled to a pump-conduit outlet, wherein the tubes transport the materials to a collection assembly 150.

3.6 System—Collection Assembly 150

The system 100 can include a collection assembly 150, which includes any or all of: a strainer, a set of one or more collection tanks, a set of pumps, hoses, and/or any other suitable materials. The collection assembly functions to receive materials from the gutter, and can further function to perform any or all of: separate materials (e.g., separate plant material from liquid materials), preprocess and/or process materials (e.g., wash plant materials, dry out plant materials, etc.), circulate materials (e.g., deposit overflow materials such as media back into pond), and/or perform any other functions.

The collection assembly 150 or at least a portion of the collection assembly (e.g., strainer) is preferably arranged on an external cart (equivalently referred to herein as an exterior cart) (e.g., as described above) outside of the harvesting region (e.g., which moves with a first axis rail), such that collection assembly moves with the gutter, but can additionally or alternatively be otherwise arranged (e.g., stationary, coupled to the rail cart, etc.).

The collection assembly 150 preferably includes one or more strainers (e.g., as shown in FIG. 21), which functions to separate plant material from collected liquid (e.g., water and media). Additionally or alternatively, the strainer(s) can function to separate materials based on size (e.g., whole plants versus plant fragments) and/or perform any other suitable functions. Further additionally or alternatively, the system can include and/or interface with a straining conveyer which runs along a length and/or circumference of the pond such that the system such that the pump assembly can deposit materials onto the straining conveyor as it moves, wherein the straining conveyor strains and delivers the plant biomass to a convenient location.

The pores of the strainer are preferably sized to catch plant material without significantly restricting flow of the gutter (e.g., and causing overflow). In preferred variations, the pore size is between 0.125" and 0.25," but can additionally or alternatively be otherwise sized (e.g., between 0" and 0.1", between 0.1" and 0.15", between 0.15" and 0.2", 0.2", between 0.2" and 0.25", 0.25", between 0.25" and 0.3", 0.3", between 0.3" and 0.5", 0.5", between 0.5" and 1", 1", between 1" and 2", 2", between 2" and 5", 5", greater then 5", etc.).

The strainer is preferably constructed of a food grade material (e.g., stainless steel, food-grade plastic such as polypropylene, etc.), but can additionally or alternatively include other suitable materials.

The collection assembly can optionally include any number of collection tanks (e.g., storage tanks, IBC tote and tanks, 4 gallon tank, 5 gallon tank, 10 gallon tank, 15 gallon tank, etc.), which can function to perform any or all of: collecting water from strained aquatic plant material, holding harvested materials (e.g., at least 2× the daily harvest), enabling overflow materials (e.g., excess water) to be directed back into a pond (e.g., by gravity, with a pump, etc.), and/or any other suitable functions. In some variations, the collection assembly further includes a submersible pump that matches a flow rate of the strainer such that a collection tank is prevented from overflowing.

The collection assembly can further include one or more preprocessing and/or processing components configured to prepare the collected material for use, such as for use as livestock feed. This can include any or all of: a rinsing component, transportation (e.g., pump and tubing) to a feed wagon, a drying component, and/or any other components.

In a first variation, the collection assembly is arranged on an exterior cart that moves with the end of the gutter, wherein the collection assembly includes at least a strainer and a set of collection tanks which receive liquid from the strainer. In specific examples, a pump is coupled to the collection tank to pump any or all of the collected liquid back into the pond.

In a second variation, the collection assembly is stationary and plant biomass is transported to the collection assembly via a set of one or more conduits. In specific examples, the set of conduits includes multiple conduits, wherein the collection assembly is arranged at the end of a second conduit which receives plants from a first conduit moving along the nozzle assembly.

In a third variation, the collection assembly includes a straining conveyer which receives materials from one or more conduits.

3.7 System—Control Subsystem 160

The system 100 can include a control subsystem 160, which functions to control the operation and movement of any or all of the system components described above, such as any or all of: the movement of the first axis rail, the movement of carts (e.g., rail cart, exterior carts, etc.), the operation of the pump assembly, the operation of any or all of the collection assembly (e.g., pumping of materials back in to a pond), and/or any other components.

The control subsystem 160 preferably includes one or more computing subsystems and/or processing subsystems (e.g., processors arranged at active components) in communication with the actuators of the system (e.g., motors, drive shafts, etc.), but can additionally or alternatively include any other suitable components. The control subsystem 160 is preferably distributed among multiple components (e.g., and/or a remote computing system), but can alternatively be localized. In specific examples, the control subsystem controls nozzle movement at a predetermined speed and/or range of speeds (e.g., between 0.3 and 0.4 m/s, 0.37 m/s, 0.33 m/s, less than 0.3 m/s, greater than 0.4 m/s, etc.).

The control subsystem 160 can optionally include any or all of: limit switches, homing components, and/or any other suitable components. In some variations, for instance, the control subsystem 160 includes a set of limit switches which can prevent any or all of: components (e.g., a nozzle) from moving off of a rail, a rail from moving off of a frame, and/or any other components configured for any suitable functions.

The control subsystem preferably includes and/or interfaces with a user interface, which functions to enable user input to be entered into the user interface. This can include any or all of: commands (e.g., to begin a harvest, to end a harvest, etc.), parameters (e.g., desired harvest speed, harvest amount, harvest pattern, etc.), selected operation modes (e.g., harvest mode, maintenance mode, etc.), and/or any other inputs. Additionally, the control subsystem can provide one or more outputs (e.g., indicating remaining harvest time, current harvest amount, graphic indicating current area harvested, etc.), such as through one or more displays.

Additionally or alternatively, the control subsystem automatically and/or partially automatically generates control instructions (e.g., as described above) based on a state of the pond, which is preferably determined based on one or more sensor inputs from a sensor subsystem 170 as described below.

3.8 System—Sensor Subsystem 170

The system 100 can include a sensor subsystem 170, which functions to detect and/or maintain one or more parameters of a harvest session, the system environment, the plants, and/or any other any other aspects of the system and method.

The sensor subsystem 170 can include one or more location, position, proximity, and/or orientation sensors, which can function to determine, control, and/or maintain any or all of: a nozzle height (e.g., above a pond surface, based on plant height, based on bending of rail system, etc.); a nozzle orientation; a nozzle location (e.g., in an X-Y plane); cart locations and/or proximity to harvesting region; and/or any other suitable information.

The sensor subsystem 170 can include one or more sensors associated with any or all of the parameters of a targeted growth environment, such as any or all of: temperature sensors, humidity sensors, nutrient (e.g., phosphate, potassium, nitrogen, nitrate, nitrite, ammonium, etc.) sensors, pH sensors, other culturing parameter sensors, light/optical sensors, conductivity sensors, dissolved oxygen sensors, plant health sensors (e.g., fluorescence sensor, camera, morphology sensors, etc.), and/or any other sensors.

The sensor subsystem 170 is preferably in communication with the control subsystem, and the sensors can be arranged at any suitable system components (e.g., on a rail system, on a cart, at the nozzle assembly, etc.), a harvesting region (e.g., pond walls, pond surface, pond floor, etc.), any other suitable locations, and/or any combination of locations.

In some variations, the sensor subsystem is used with the control subsystem to automatically determine a harvesting pattern for the nozzle assembly and/or harvesting transport system, wherein the sensor subsystem functions to scan the crop (e.g., scan the surface of a pond), map out various parameters such as density of growth and/or locations of pests and/or invasive plants, wherein the control subsystem determines a set of commands configured to address this mapping.

In a first variation, the sensor subsystem includes one or more sensors arranged proximal to the pond (e.g., arranged within the pond, coupled to a wall of the pond, floating in the pond, secured to the pond floor, etc.) configured to detect one or more pond conditions (e.g., temperature, pH, nutrients, plant density, etc.). Additionally or alternatively, the sensor subsystem can include one or more sensors coupled to the transport subsystem (e.g., to detect where a rail is, to detect if a rail is going to run off of a track, to detect a height of the rail relative to the pond surface, to detect a bending of a rail, etc.) and/or to a nozzle assembly (e.g., to detect a height of the nozzle relative to the pond surface, to detect how much of the nozzle is submerged in the pond, etc.) and/or to any other components of the system.

Additionally or alternatively, the system can include any other suitable components.

4. Method 200

As shown in FIG. 2, the method 200 includes operating the harvesting system 100 in a set of one or more operation modes. Additionally or alternatively, the method 200 can include any other suitable processes.

The set of operation modes can include a harvesting operation mode, wherein the harvesting operation mode includes a set of harvesting processes.

The harvesting operation mode is preferably performed in accordance with one or more harvesting specification parameters, such as any or all of: a daily harvest area (e.g., daily harvest of between 20% and 40% of harvesting region surface, daily harvest of 20% of harvesting region surface, daily harvest of 25% of harvesting region surface, daily harvest of 30% of harvesting region surface, daily harvest of 35% of harvesting region surface, daily harvest of 40% of harvesting region surface, daily harvest of greater than 40% of harvesting region surface etc.). This can function, for instance, to maintain a certain amount of remaining plant material (e.g., based on an optimal coverage of a pond surface for plant growth). The harvesting specification parameters can optionally include one or more harvesting time parameters (e.g., depending on size of harvesting region). In some variations, for instance, the harvesting operation mode enables a harvest of a pond to be completed in between 1 and 10 minutes. Additionally or alternatively, a harvest of the pond can be completed in less than 1 minutes, greater than 10 minutes, and/or within any suitable time period (e.g., depending on the size of the pond).

The harvesting operation mode is preferably able to be performed in numerous operating conditions, such as any or all of: temperature fluctuations (e.g., between 40-140 F. in growing environment); relative humidity (e.g., up to 100% relative humidity); and/or any other conditions.

The harvesting operation mode is preferably performed under operation of the control subsystem (e.g., as described above), such as in accordance with any or all of the actuators and parameters described above, but can additionally or alternatively be performed in accordance with any components of any suitable system.

In a first variation, the harvesting operation mode includes any or all of the following processes: adjusting a nozzle to a harvesting height or range of harvesting heights (e.g., to account for droop of rail system); moving a first axis rail to a first position along a length of the harvesting region (e.g., moving to an initial edge of the harvesting region); moving the nozzle along the first axis rail to enable the nozzle to traverse the width, wherein material is collected via a pump assembly during collection and transported via a gutter to a collection system; moving the nozzle back to a starting position on the first axis rail; moving the first axis rail to a second position; repeating the nozzle movement along the first axis rail; and repeating the movements of the first axis rail and nozzle until the desired surface of the harvesting region is harvested. This can be any or all of: an entire surface and/or a majority surface of a pond, a partial surface of the pond (e.g., as determined based on a previous harvesting region, based on one or more inputs from a sensor subsystem such as an optical indication of which region(s) have a high density of aquatic plants, etc.), and/or any combination. The harvesting operation mode can additionally or alternatively include any other suitable processes, such as any or all of: straining materials; pumping materials back into a pond; controlling a level of accumulated biomass (e.g., dead plants, digester slurry, biomass accumulated at the bottom of a pond, biomass suspended within a pond, etc.); maintaining a density of aquatic plants through the harvesting (e.g., between 500-1200 grams/meter-squared of aquatic plants on a fresh weight basis); distributing media (e.g., fresh media, recycled media, etc.); and/or any other suitable processes.

In specific examples, in the harvesting operation mode, the first axis rail is able to be positioned in any of a set of rows (e.g., predetermined, dynamically determined, etc.) wherein the nozzle moves along the row to harvest aquatic plants within and/or proximal to the row.

In additional or alternative examples, the first axis rail and/or nozzle can move (e.g., simultaneously, individually, etc.) in any suitable harvesting patterns.

In a second variation, the harvesting operation mode includes any or all of the following processes: adjusting a set of multiple nozzle to a harvesting height or range of harvesting heights (e.g., to account for droop of rail system); moving a first axis rail to a first position along a length of the harvesting region (e.g., moving to an initial edge of the harvesting region); collecting material through the set of multiple, stationary nozzles; moving the first axis rail to a second position; and repeating the movements of the first axis rail and until the desired surface of the harvesting region is harvested. The harvesting operation mode can additionally or alternatively include any other suitable processes, such as any or all of: straining materials; pumping materials back into a pond; controlling a level of accumulated biomass (e.g., dead plants, digester slurry, biomass accumulated at the bottom of a pond, biomass suspended within a pond, etc.); maintaining a density of aquatic plants through the harvesting (e.g., between 500-1200 grams/meter-squared of aquatic plants on a fresh weight basis); and/or any other suitable processes.

In a third variation, the harvesting operation mode includes moving one or more nozzles across a surface of a pond with a drive wheel and/or drive train assembly.

In a fourth variation, the harvesting operation mode includes moving a nozzle assembly independently, wherein the nozzle assembly includes an onboard transport subsystem (e.g., floating weir with driving ability).

The set of operation modes can additionally or alternatively include any other suitable modes, such as any or all of: an off mode; a dredge mode; a cleaning mode (e.g., rinsing of components); a preprocessing and/or processing mode (e.g., preparing feed from collected material); a sampling mode (e.g., sampling of images, nutrients, conductivity, pH, etc.); a plant feeding mode; a spray cooling and/or humidification mode; a contaminant removal mode (e.g., wherein the nozzle height is adjusted to remove a contaminant); and/or any other suitable modes.

Any or all of the modes can be applied independently, simultaneously, contemporaneously (e.g., overlapping, partially overlapping, etc.), and/or any combination. In some variations, for instance, a media distribution mode is applied simultaneously with and/or contemporaneously with (e.g., temporally overlapping, partially overlapping, etc.) the harvesting mode (e.g., wherein media is applied in a trailing fashion relative to the nozzle movement, wherein media is applied after the nozzle has traversed an entire row and/or region of the pond, when the nozzle has returned to an initial position, when the nozzle has reached an end position, etc.). Additionally or alternatively, these modes can be applied separately, other modes can be applied simultaneously, and/or the method can implement any operation modes in any suitable way.

Additionally or alternatively, the method can include any other suitable operation modes and/or implement any other suitable processes.

5. Variations

In a first variation of the system 100 (e.g., as shown in FIG. 17), the system is configured to harvest floating aquatic plants from the surface of a pond, wherein the system includes any or all of: a nozzle assembly arranged onboard a rail cart and including a nozzle configured to collect materials from a 360-degree range or the majority of a 360-degree range through a set of one or more inlets; a pump assembly arranged onboard a rail cart and including a diaphragm pump which receives materials collected at the nozzle and outputs them to a conduit (e.g., gutter) through a pump-conduit outlet; a transport subsystem including a rail subsystem, the rail subsystem including a first axis rail configured to move along a length of the pond, a rail cart configured to move along the first axis rail along a width of the pond, wherein the rail cart supports the nozzle assembly, the pump assembly, and electronics associated with the portion of the control subsystem onboard the rail cart, a rail support system including a set of motors and/or belt configured to move (e.g., translate, rotate, etc.) the first axis rail, and an external cart supporting a collection assembly; one or more conduits (e.g., a mobile gutter fixed to and running along the length of the first axis rail, a stationary gutter arranged outside of the pond which receives material from the mobile gutter, etc.) wherein the conduit receives materials collected at the nozzle assembly via a pump-conduit outlet and/or from another conduit and transports the materials to the collection assembly; the collection assembly optionally arranged on an external cart (equivalently referred to herein as an exterior cart) that moves with the end of the gutter, wherein the collection assembly includes a set of one or more collection vessels (e.g., for the plant material, for media to redistribute, etc.) and optionally a separation and/or drying component for the plant material (e.g., strainer, drying belt, etc.); optionally a media distribution subsystem (e.g., coupled to an X-axis rail, coupled to the pond, etc.); a control subsystem which functions to determine and/or implement an operation mode and/or one or more parameters associated with an operation mode; and a sensor subsystem in communication with the control subsystem.

In a first set of specific examples (e.g., as shown in FIGS. 14A-14E), the conduit subsystem includes a gutter coupled to the X-axis rail(s), wherein the gutter moves with the rail subsystem and deposits collected material into a collection assembly which preferably moves with the rail subsystem, but can additionally or alternatively be stationary. The media distribution subsystem is further coupled to the rail subsystem, and includes a set of multiple conduits (e.g., flexible tubes) which run along a length of a rail and deposit media (e.g., recycled media collected at the collection assembly) into the pond.

In a second set of specific examples (e.g., as shown in FIG. 18), the conduit subsystem includes a first gutter coupled to the X-axis rail(s), wherein the first gutter moves with the rail subsystem, and a second gutter which is stationary (e.g., coupled to a pond wall, arranged outside of the pond, etc.), wherein the second gutter receives material from the first gutter and deposits it into a collection assembly which is preferably stationary, but can additionally or alternatively be mobile. The system can further optionally include a media distribution, such as that described above and/or a stationary media distribution subsystem (e.g., tube system arranged on the pond floor).

In a second variation of the system, the system differs from the first variation in that the system includes multiple nozzles statically arranged along one or more X-axis rails, wherein the nozzles are stationary relative to the rail but move relative to the pond as the rail moves (e.g., with a mobile collection assembly, with movement of the X-axis rails along rail supports arranged in the Y-axis, etc.). Additionally or alternatively, the system can be otherwise configured relative to the 1st variation. In specific examples, the rail supports include a belt containing a set of electronics for the system.

In a third variation of the system (e.g., as shown in FIG. 20), the system includes a nozzle assembly, wherein the nozzle assembly includes one or more inlets configured to collect aquatic plant material from a pond; a belt-driven transport subsystem including a rotating pulley or wheel arranged on a shaft, the shaft arranged along a length of the pond, wherein rotation of the wheel moves a belt and/or rope, wherein the nozzle assembly is coupled to the belt and/or rope and therefore moves along a length of the pond upon rotation of the wheel. The nozzle assembly can optionally include one or more flotation devices, which function to enable the nozzle assembly to float the surface of the pond, and/or a collection tray which moves with the nozzle assembly. The system can optionally include a pump system which functions to collect material through the nozzle; additionally or alternatively, the nozzle assembly can collect materials passively (e.g., through movement of the nozzle and a collection tray). Additionally or alternatively, the system can include any other suitable components.

In a fourth variation of the system (e.g., as shown in FIG. 21), the system includes a floating weir nozzle assembly, wherein the floating weir nozzle assembly moves along the surface of the pond and collects materials through one or more inlets. The system can optionally include a pump system which functions to collect material through the nozzle; additionally or alternatively, the nozzle assembly can collect materials passively (e.g., through movement of the nozzle and a collection tray). Additionally or alternatively, the system can include any other suitable components.

Additionally or alternatively, the system can include any other suitable components.

In a first variation of operating the system, the method includes: scanning (e.g., routinely scanning) the pond (e.g., optically, with a set of sensors, etc.) to build a model of its current state, which can take into account any or all of: a density of the crop, a health of the crop (e.g., based on color, size, growth rate, etc.), a nutrient quality of the water, temperature, humidity, and/or any other parameters; based on the model, determines one or more harvesting parameters (e.g., when to harvest, how frequently to harvest, which regions to harvest, which rows of the pond to harvest, what the flow parameters of the pump should be, etc.); moves a rail of the frame subsystem and/or one or more nozzles to harvest based on these parameters; collects the plants and optionally deposits them into and/or transports them to a collection assembly; optionally indirectly (e.g., based on the nozzle features, flow features, etc.) and/or directly (e.g., with additional nozzle movement) redistributes the remaining plants; and optionally processes the plants (e.g., rinsing plants, redistributes recycled, transports elsewhere, etc.). Additionally or alternatively, the method can include distributing media to the pond, dredging the pond, and/or any other processes performed in any suitable order.

Additionally or alternatively, the method can include any other suitable operation modes and/or implement any other suitable processes.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A system for aquatic plant harvesting in a pond, the system comprising:

a beam configured to extend across a first axis of a pond and to move along a second axis perpendicular to the first axis;

a nozzle assembly comprising a nozzle, wherein the nozzle assembly moves along a length of the beam and vertically actuates the nozzle;

a pump fluidly connected to the nozzle, wherein the pump extracts aquatic plant material from the pond through the nozzle;

a set of sensors monitoring a set of pond parameters;

a control subsystem that controls motion of the beam along the second axis based on the set of pond parameters.

2. The system of claim 1, wherein the set of pond parameters comprises a pond surface plant coverage metric.

3. The system of claim 2, wherein the control subsystem determines whether to extract the aquatic plants by comparing the pond surface plant coverage metric to a minimum plant coverage threshold and a maximum plant coverage threshold.

4. The system of claim 2, wherein the beam moves along the second axis at a harvesting speed while extracting aquatic plants, wherein the control subsystem dynamically adjusts the harvesting speed based on the pond surface plant coverage metric.

5. The system of claim 1, further comprising a secondary nozzle assembly mounted to the beam, wherein the secondary nozzle assembly moves along the length of the beam.

6. The system of claim 1, further comprising a fluid channel downstream of the nozzle, the fluid channel carrying extracted aquatic plants, wherein the motion of the beam is based on a concentration of extracted aquatic plants in the fluid channel.

7. The system of claim 1, wherein the nozzle defines a superior region and an inferior region, wherein the superior region and inferior region cooperatively:

guide aquatic plant material adjacent the nozzle into an inlet of the nozzle; and block aquatic plant material inferior to the nozzle from entering the inlet of the nozzle.

8. The system of claim 7, wherein the nozzle comprises multiple inlets that cooperatively ingest aquatic plant material from a region azimuthally spanning 360° around the nozzle.

9. A system for aquatic plant harvesting, comprising:

a beam configured to extend across a first axis of a pond;

a set of motorized carts connected to and configured to move the beam along a second axis of the pond perpendicular axis to the first axis of the pond;

a nozzle assembly comprising a nozzle, wherein the nozzle assembly moves along a length of the beam and vertically actuates the nozzle;

a pump fluidly connected to the nozzle, wherein the pump extracts aquatic plants from the pond through the nozzle;

a set of sensors configured to monitor a surface density of aquatic plants in a region of the pond; and a control subsystem configured to control motion of the nozzle assembly based on the surface density of aquatic plants.

10. The system of claim 9, wherein the set of motorized carts comprises a first wheeled cart that does not move along a rail.

11. The system of claim 10, wherein the set of motorized carts further comprises a second wheeled cart, wherein the first wheeled cart and the second wheeled cart are independently controlled.

12. The system of claim 9, wherein the control subsystem comprises a remote computing system.

13. The system of claim 9, wherein the control subsystem dynamically determines whether to extract aquatic plants from the pond during motion of the nozzle assembly.

14. The system of claim 9, wherein the control subsystem estimates a volumetric density of aquatic plants based on the surface density, wherein motion of the nozzle assembly is based on the volumetric density.

15. The system of claim 9, wherein the control subsystem controls the system to move between ponds of a plurality of ponds.

16. The system of claim 9, further comprising a secondary nozzle assembly mounted to the beam, wherein the secondary nozzle assembly moves along the length of the beam.

17. The system of claim 9, further comprising a fluid channel downstream from the nozzle, wherein the fluid channel carries extracted aquatic plants, wherein the motion of the nozzle assembly is based on a concentration of extracted aquatic plants in the fluid channel.

18. The system of claim 9, wherein the nozzle assembly moves at a harvesting speed while extracting aquatic plants, wherein the control subsystem dynamically adjusts the harvesting speed based on the surface density of aquatic plants.

19. The system of claim 9, wherein the control subsystem controls the nozzle assembly to dynamically maintain a predetermined position relative to a water surface of the pond.

20. The system of claim 9, wherein the nozzle defines a superior region and an inferior region that cooperatively guide aquatic plant material moving laterally into an inlet of the nozzle and block aquatic plant material moving vertically into the inlet.

* * * * *